United States Patent
Han

(10) Patent No.: US 11,502,896 B2
(45) Date of Patent: Nov. 15, 2022

(54) NETWORK FAILURE PROTECTION METHOD, SYSTEM, AND STORAGE MEDIUM

(71) Applicant: ZTE CORPORATION, Guangdong (CN)

(72) Inventor: Yufang Han, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 106 days.

(21) Appl. No.: 17/044,452

(22) PCT Filed: Feb. 21, 2019

(86) PCT No.: PCT/CN2019/075689
§ 371 (c)(1),
(2) Date: Oct. 1, 2020

(87) PCT Pub. No.: WO2019/201013
PCT Pub. Date: Oct. 24, 2019

(65) Prior Publication Data
US 2021/0105175 A1  Apr. 8, 2021

(30) Foreign Application Priority Data

Apr. 18, 2018 (CN) .......................... 201810349035.4

(51) Int. Cl.
*H04L 41/0663* (2022.01)
*H04L 41/0631* (2022.01)
*H04L 45/28* (2022.01)
*H04L 45/745* (2022.01)

(52) U.S. Cl.
CPC ........ *H04L 41/0663* (2013.01); *H04L 41/065* (2013.01); *H04L 45/28* (2013.01); *H04L 45/745* (2013.01)

(58) Field of Classification Search
CPC ... H04L 41/0663; H04L 41/065; H04L 45/28; H04L 45/745; H04L 45/74; H04L 2001/0095
See application file for complete search history.

(56) References Cited

U.S. PATENT DOCUMENTS

2008/0304407 A1* 12/2008 Umansky ................ H04L 45/02
370/222
2015/0138961 A1*  5/2015 Wijnands ................ H04L 45/22
370/228

(Continued)

FOREIGN PATENT DOCUMENTS

| CN | 106572016 A | 4/2017 |
|----|-------------|--------|
| CN | 107135151 A | 9/2017 |

(Continued)

OTHER PUBLICATIONS

China Patent Office, CN201810349035.4 First Office Action dated May 6, 2021 and the English translation thereof.

(Continued)

*Primary Examiner* — Thu V Nguyen
*Assistant Examiner* — Aye M Aung
(74) *Attorney, Agent, or Firm* — Li & Cai Intellectual Property (USA) Office

(57) ABSTRACT

A method, a system and a storage medium for network failure protection belonging to the field of network technologies. The method comprises: allocating, for each forwarding link of the ring topology, a protection ring bit position opposite to the direction of a working path; newly adding BRFT for storing adjacent forwarding table entries related to forwarding along the direction of the protection ring bit position; and when a BIER message is forwarded along the working path, if a BFR detects that the downstream adjacency fails, searching for entry content of the BTAFT, finding the correlation between the link bit position (Continued)

of the fault forwarding link and the protection ring bit position, and forwarding, on the basis of entry content of the BRFT, the BIER message to the opposite end fault point of the opposite end along the direction of the protection ring bit position.

12 Claims, 17 Drawing Sheets

(56) References Cited

U.S. PATENT DOCUMENTS

| | | | | |
|---|---|---|---|---|
| 2016/0254987 A1* | 9/2016 | Eckert | ................... | H04L 69/22 |
| | | | | 370/390 |
| 2016/0254991 A1* | 9/2016 | Eckert | ................ | H04L 12/4633 |
| | | | | 370/225 |

FOREIGN PATENT DOCUMENTS

| | | |
|---|---|---|
| CN | 107171977 A | 9/2017 |
| CN | 107204920 A | 9/2017 |
| WO | WO 2017059699 A1 | 4/2017 |
| WO | WO-2017152576 A1 * 9/2017 ............. H04L 45/16 |

OTHER PUBLICATIONS

Huawei, et al. "Protection Methods for BIER-TE draft-eckert-bier-te-frr-03" issued on Mar. 5, 2018, Network Working Group.

* cited by examiner

| (index):<br>SI:BitPosition | (Adjacencies):<br><empty> or one or more per entry | DNR | C-BM | (status): |
|---|---|---|---|---|
| 1 (0:0001) | forward_connected(interface1,neighbor1) | T | 0001 | UP/DOWN |
| 2 (0:0010) | forward_connected(interface2,neighbor2) | F | 0010 | UP/DOWN |
| 3 (0:0100) | forward_connected(interface3,neighbor3) | T | 0100 | UP/DOWN |

FIG.23

| FRR<br>(Adjacency Index) | (Failed)<br>BP | (Downstream)<br>BP | (ResetBitmask) | (AddBitmask) |
|---|---|---|---|---|
| 0:1 | 5 | 5 | ..0010000 | ..11000000 |

| (index):<br>SI:BitPosition | (Adjacencies):<br><empty> or one or more per entry | DNR | C-BM | (status): |
|---|---|---|---|---|
| 5 (0:10000) | forward_connected(interfaceAB,neighborB) | T | 10000 | UP/DOWN |

| (index):<br>SI:Bitpositon | (Adjacencies):<br><empty> or one or more per entry | DNR | C-BM | (status) |
|---|---|---|---|---|
| 1 (0:0001) | forward_connected (interfaceAD, neighbor=D) | T | 0001 | UP/DOWN |
| 2 (0:0010) | forward_connected (interfaceAD, neighbor=D) | T | 0010 | UP/DOWN |

B:

| (index):<br>SI:Bitpositon | (Adjacencies):<br><empty> or one or more per entry | DNR | C-BM | (status) |
|---|---|---|---|---|
| 1 (0:0001) | forward_connected (interfaceBA, neighbor=A) | T | 0001 | UP/DOWN |
| 2 (0:0010) | forward_connected (interfaceBA, neighbor=A) | T | 0010 | UP/DOWN |

C:

| (index):<br>SI:Bitpositon | (Adjacencies):<br><empty> or one or more per entry | DNR | C-BM | (status) |
|---|---|---|---|---|
| 2 (0:0010) | forward_connected (interfaceCB, neighbor=B) | T | 0010 | UP/DOWN |

D:

| (index):<br>SI:Bitpositon | (Adjacencies):<br><empty> or one or more per entry | DNR | C-BM | (status) |
|---|---|---|---|---|
| 1 (0:0001) | forward_connected (interfaceDE, neighbor=E) | T | 0001 | UP/DOWN |
| 2 (0:0010) | forward_connected (interfaceDE, neighbor=E) | T | 0010 | UP/DOWN |

E:

| (index):<br>SI:Bitpositon | (Adjacencies):<br><empty> or one or more per entry | DNR | C-BM | (status) |
|---|---|---|---|---|
| 1 (0:0001) | forward_connected (interfaceEB, neighbor=B) | T | 0001 | UP/DOWN |
| 2 (0:0010) | forward_connected (interfaceEF, neighbor=F) | T | 0010 | UP/DOWN |

F:

| (index):<br>SI:Bitpositon | (Adjacencies):<br><empty> or one or more per entry | DNR | C-BM | (status) |
|---|---|---|---|---|
| 2 (0:0010) | forward_connected (interfaceFC, neighbor=C) | T | 0010 | UP/DOWN |

| (index) : SI:Bitpositon | (Adjacencies) : <empty> or one or more per entry | DNR | C-BM | (status) |
|---|---|---|---|---|
| 1 (0:0001) | forward_connected (interfaceAD, neighbor=D) | T | 0011 | UP/DOWN |
| 2 (0:0010) | forward_connected (interfaceAD, neighbor=D) | T | 0011 | UP/DOWN |

B.

| (index) : SI:Bitpositon | (Adjacencies) : <empty> or one or more per entry | DNR | C-BM | (status) |
|---|---|---|---|---|
| 1 (0:0001) | forward_connected (interfaceBA, neighbor=A) | T | 0011 | UP/DOWN |
| 2 (0:0010) | forward_connected (interfaceBA, neighbor=A) | T | 0011 | UP/DOWN |

C.

| (index) : SI:Bitpositon | (Adjacencies) : <empty> or one or more per entry | DNR | C-BM | (status) |
|---|---|---|---|---|
| 2 (0:0010) | forward_connected (interfaceCB, neighbor=B) | T | 0010 | UP/DOWN |

D.

| (index) : SI:Bitpositon | (Adjacencies) : <empty> or one or more per entry | DNR | C-BM | (status) |
|---|---|---|---|---|
| 1 (0:0001) | forward_connected (interfaceDE, neighbor=E) | T | 0011 | UP/DOWN |
| 2 (0:0010) | forward_connected (interfaceDE, neighbor=E) | T | 0011 | UP/DOWN |

E.

| (index) : SI:Bitpositon | (Adjacencies) : <empty> or one or more per entry | DNR | C-BM | (status) |
|---|---|---|---|---|
| 1 (0:0001) | forward_connected (interfaceEB, neighbor=B) | T | 0011 | UP/DOWN |
| 2 (0:0010) | forward_connected (interfaceEF, neighbor=F) | T | 0011 | UP/DOWN |

F.

| (index) : SI:Bitpositon | (Adjacencies) : <empty> or one or more per entry | DNR | C-BM | (status) |
|---|---|---|---|---|
| 2 (0:0010) | forward_connected (interfaceFC, neighbor=C) | T | 0010 | UP/DOWN |

| FRR (Adjacency Index) | (Failed) BP | (Downstream) BP | (ResetBitmask) | (AddBitmask) |
|---|---|---|---|---|
| 0:1 | 1 | 1 | ..000011 | ..001100 |

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            BIFT-id            | TC |S|       TTL             |
+-+-+-+-+-+-+-+-+-+-+-+-+-+-+-+-+-+-+-+-+-+-+-+-+-+-+-+-+-+-+-+-+
|Nibble | Ver | BSL |             Entropy                      |
+-+-+-+-+-+-+-+-+-+-+-+-+-+-+-+-+-+-+-+-+-+-+-+-+-+-+-+-+-+-+-+-+
|OAM|P|R|  DSCP   |   Proto     |          BFIR-id             |
+-+-+-+-+-+-+-+-+-+-+-+-+-+-+-+-+-+-+-+-+-+-+-+-+-+-+-+-+-+-+-+-+
|                  BitString  (first 32 bits)                 ~
+-+-+-+-+-+-+-+-+-+-+-+-+-+-+-+-+-+-+-+-+-+-+-+-+-+-+-+-+-+-+-+-+
~                                                             ~
+-+-+-+-+-+-+-+-+-+-+-+-+-+-+-+-+-+-+-+-+-+-+-+-+-+-+-+-+-+-+-+-+
~                  BitString  (last 32 bits)                   |
+-+-+-+-+-+-+-+-+-+-+-+-+-+-+-+-+-+-+-+-+-+-+-+-+-+-+-+-+-+-+-+-+
```

FIG.29

NETWORK FAILURE PROTECTION METHOD, SYSTEM, AND STORAGE MEDIUM

FIELD OF THE INVENTION

The present disclosure relates to the field of technology of network, and in particular, to a network failure protection method, a system, and a storage medium in Bit Index Explicit Replication Traffic Engineering (BIER-TE).

BACKGROUND

The BIER-TE proposed in the Draft-Eckert-Bier-Te-Arch is a BIER forwarding architecture based on traffic engineering, which introduces a BIER-TE controller layer on the basis of the BIER, issues a forwarding table through a controller, plans an optimal path as required by using a Path Computation Element (PCE), and forwards messages in an explicit hop-by-hop mode so that the network traffic control becomes more flexible. On this basis, another article Draft-Eckert-Bier-Te-Frr further provides three measures for BIER-TE network fault protection, including Point-to-Point Tunneling (PPT), Header Modification (HM) and Bier-in-Bier Encapsulation (BBE). The three measures have respective advantages but still have some disadvantages.

SUMMARY

The present disclosure provides a method, a system, and a storage medium for network failure protection, which aims to bypass a failed forwarding link when a BIER message is forwarded by means of the protection ring bit position and the newly added BIER Ring Forwarding Table (BRFT), ensuring that BIER message is successfully forwarded to each normal node of a ring topology.

To achieve the above purpose, according to an embodiment of the present disclosure, there is provided a network failure protection method, including step of: allocating a protection ring bit position for each forwarding link of a ring topology, wherein a direction of the protection ring bit position is opposite to a working path of a corresponding forwarding link; newly adding a BIER Ring Forwarding Table (BRFT), wherein the BRFT is configured to store an adjacent forwarding table entry related to forwarding along the direction of the protection ring bit position; and when a BIER message is forwarded along the working path, in response to a failure of downstream adjacency of a forwarding link detected by a BIER Forwarding Router (BFR), searching for entry content of a BIER-TE Adjacency FRR Table (BTAFT) to find a correlation between a link bit position of a failure forwarding link and a protection ring bit position, and forwarding, on the basis of the entry content of the BRFT, the BIER message to a failure point of an opposite end along the direction of the protection ring bit position.

To achieve the above purpose, according to an embodiment of the present disclosure, there is provided a network failure protection system, including: a BIER-TE controller and a BIER Forwarding Router, wherein the BIER-TE controller is configured to allocate a protection ring bit position for each forwarding link of a ring topology, wherein a direction of the protection ring bit position is opposite to a working path of a corresponding forwarding link, newly add a BIER Ring Forwarding Table (BRFT), wherein the BRFT is configured to store an adjacent forwarding table entry related to forwarding along the direction of the protection ring bit position, and forward the table entry related to forwarding of a BIER message to the BIER Forwarding Router through a southbound interface; and the BIER Forwarding Router is configured to receive the table entry related to forwarding of the BIER message sent from the BIER-TE controller through the southbound interface; when the BIER message is forwarded along the working path, in response to a failure of downstream adjacency of a forwarding link detected by a BIER forwarding router (BFR), search for the entry content of a BIER-TE Adjacency FRR Table (BTFT) to find a correlation between a link bit position of a failure forwarding link and a protection ring bit position, and forward, on the basis of the entry content of the BRFT, the BIER message to a failure point of an opposite end along the direction of the protection ring bit position.

To achieve the above purpose, according to an embodiment of the present disclosure, there is provided a storage medium for computer readable storage, the storage medium storing one or more program, wherein when executed by at least one processor, the at least one program implements the steps of the above method.

The disclosure provides a method, system, and storage medium for network failure protection in BIER-TE. The method allocates a protection ring bit position for each forwarding link of a ring topology, wherein the direction of the protection ring bit position is set opposite to the working path of the corresponding forwarding link. In the meanwhile, the BIER Ring Forwarding Table (BRFT) is newly added for storing adjacent forwarding table entries related to forwarding along the direction of the protection ring bit position. As such, when the BIER message is forwarded along the working path, if the BIER Forwarding Router (BFR) detects that the downstream adjacency of a certain forwarding link fails, the entry contents of the BTAFT is searched to find the correlation between the link bit position of the failure forwarding link and the protection ring bit position, and the BIER message is forwarded to the opposite end failure point along the direction of the protection ring bit position by combining the entry contents of the BRFT. Therefore, when the BIER message is forwarded, the failure forwarding link can be bypassed, and the BIER message is successfully forwarded to each normal node of the ring topology.

The implementation, functional characteristics and advantages of the present disclosure will be further described in conjunction with the embodiments and with reference to the accompanying drawings.

FIG. 23 illustrates a simplified example of a BRFT according to the first embodiment.

FIG. 24 illustrates a simplified example of a BTAFT according to the first embodiment.

FIG. 25 illustrates BRFT entries at node A according to the fourth embodiment.

FIG. 26 illustrates BRFT entries at each node before Integration according to the fifth embodiment.

FIG. 27 illustrates BRFT entries at each node after Integration according to the fifth embodiment.

FIG. 28 illustrates BTAFT entries at node B according to the sixth embodiment.

FIG. 29 illustrates a simplified example of BIER message header according to the seventh embodiment.

DETAILED DESCRIPTION OF THE EMBODIMENTS

It should be known that the embodiments described here are only for explaining, rather than limiting the present disclosure.

In the following description, the suffixes to represent elements such as "module", "part" or "unit" are only used for facilitating the description of the present disclosure, and have no special meanings themselves. Therefore, "module", "part" or "unit" can be used in a mixed manner.

First Embodiment

Figure 1:
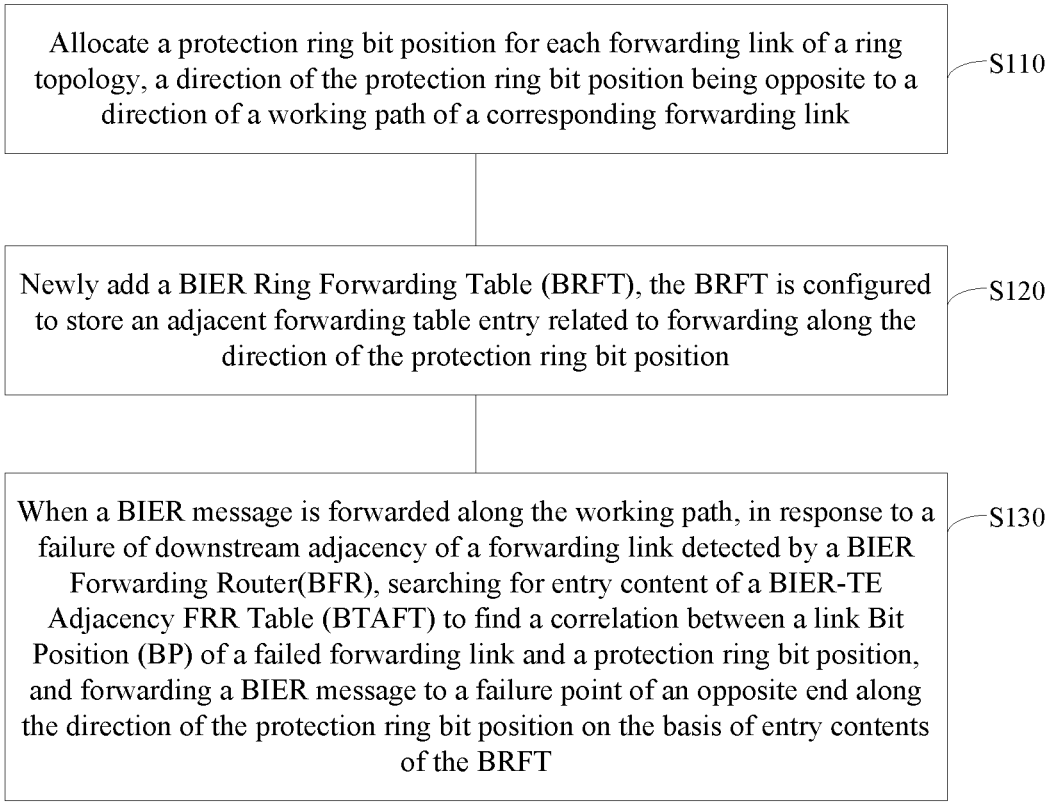
FIG. 1 is a flowchart of network failure protection method according to a first embodiment of the disclosure.

As shown in FIG. 1, in an embodiment of the present disclosure, there is provided a network failure protection method in Bit Index Explicit Replication Traffic Engineering (BIER-TE), including Steps S110, S120 and S130.

In Step S110, a protection ring bit position is allocated for each forwarding link of a ring topology, a direction of the protection ring bit position being opposite to a direction of a working path of the corresponding forwarding link.

Figure 2:
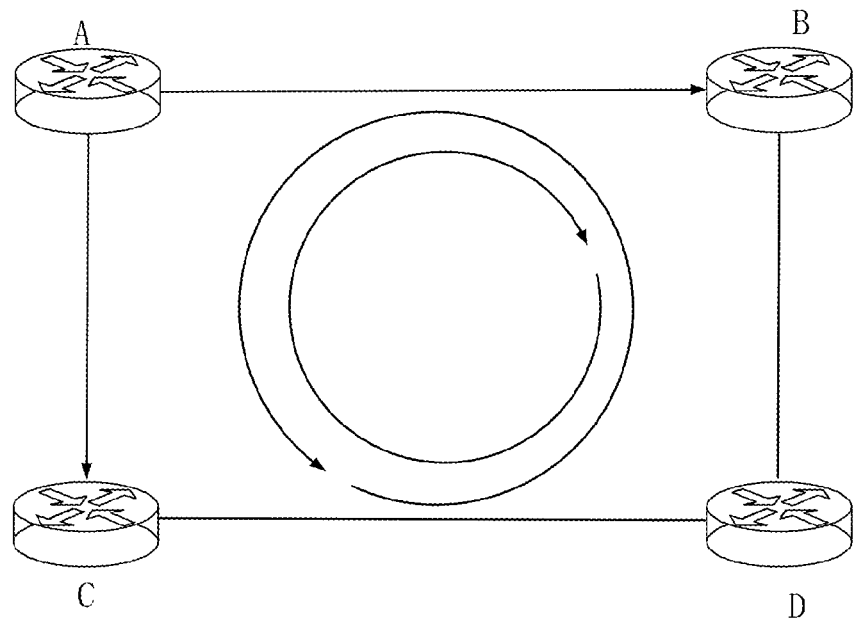
FIG. 2 is an overview diagram of the ring network protection according to the present disclosure.

In this embodiment, the network failure in BIER-TE (Bit Index Explicit Replication Traffic Engineering) can be protected by the concept of ring network protection. For the ring topology of a BFR (BIER Forwarding Router), FIG. 2 shows the allocating of the link bit position (BitPosition, BP) and the protection ring bit position for each forwarding link of the ring topology. Herein, a direction of the link bit position (BitPosition, BP) is the working path of the corresponding forwarding link, and a direction of the protection ring bit position is disposed opposite to the direction of the link bit position. In other words, the direction of the protection ring bit position is disposed opposite to the working path of the corresponding forwarding link. In this way, when the direction of the link bit position (BitPosition, BP) is clockwise, the direction of the protection ring bit position is counterclockwise; and when the direction of the link bit position (BitPosition, BP) is counterclockwise, the direction of the protection ring bit position is clockwise. As shown in FIG. 2, for the forwarding link in the A to B direction, the link bit position (BitPosition, BP) is clockwise, and the protection ring bit position having the direction opposite thereto (the direction shown by the outer circle line in the figure) is used for protection (that is, the protection is performed by the protection ring bit position in the counterclockwise direction); and for the forwarding link in the A to C direction, the link bit position (BitPosition, BP) is counterclockwise, the protection ring bit position having the direction opposite thereto (the direction shown by the inner circle line in the figure) is used for protection (that is, the protection is performed by the protection ring bit position in the clockwise direction (in the figure)). The protection ring bit position and the link bit position (BitPosition, BP) of the protected forwarding link are required to belong to the same <SD:BSL:SI> set.

The allocation and sharing of protection ring bit positions should follow the following rules: if the protected forwarding link of the ring topology is a Special Interconnected-link, the correspondingly allocated protection ring bit positions cannot be shared, but for any other links, the correspondingly allocated protection ring bit positions can be shared.

In Step S120, a BIER Ring Forwarding Table (BRFT) is newly added, wherein the BRFT is configured to store an adjacent forwarding table entry related to forwarding along the direction of the protection ring bit position.

The addition of the BRFT is newly added, which is mainly used to store adjacent forwarding table entries related to forwarding along the direction of the protection ring bit position. When a downstream adjacency of the ring topology fails (including a link failure and a node failure), the BIER message needs to search the BRFT to forward data in the direction of the protection ring bit position.

As shown in FIG. 23, the BRFT table includes at least the following items:

Bit Index Information, which is the same as Bit Index Information in the Bit Index Forwarding Table (BIFT) of BIER-TE, wherein one BRFT table corresponds to one id of the BIFT, and Bit Index Information indicates a bit index corresponding to the BitPosition in the BRFT Adjacencies Information, which is the same as adjacencies information in the Bit Index Forwarding Table (BIFT) of BIER-TE, and which indicates information related to adjacency, such as information of label, ports and the like;

Do Not Reset (DNR) flag Information, for the adjacency of type of forward_connected, the field of which indicates whether its corresponding bit needs to be cleared, wherein T indicates Not Clear, and F indicates Clear;

Clear-BitMask (C-BM) Information that needs to be cleared when the message is forwarded, which is similar to F-BM, and which is used along with a bit string (BitString) to obtain a new bit string (BitString) according to a forwarding rule when data is forwarded; and Entry Status Information, which indicates a table entry status related to detection, wherein a quick detection status of the link is associated with the related table entry.

The entry contents of the BRFT may be specifically formed through the following steps. According to the allocation process of the protection ring bit position, the BRFT table configuration is carried out on each node passed by the protection ring bit position. Further, according to the link types (including Special Interconnected-link and common link) of the protected forwarding link, a closed ring and a non-closed ring are found, and for the non-closed ring, the DNR (Do Not reset) flag information of the DS-NNHs links on the ring is set to be F, and the DNR (Do Not reset) flag information of the rest links is set to be T; for the closed ring, the DNR (Do Not reset) flag information of all links on the ring is set to be T (closed ring), and C-BM information that needs to be cleared when the message is forwarded is set as a bit string corresponding to a protection ring bit position.

In Step S130, when a BIER message is forwarded along the working path, if a BIER Forwarding Router (BFR) detects that downstream adjacency of a certain forwarding link fails, entry content of a BIER-TE Adjacency FRR Table (BTAFT) is searched for to find the correlation between the link bit position (Bit Position, BP) of a failure forwarding link and the protection ring bit position, and the BIER message is forwarded to a failure point of the opposite end along the direction of the protection ring bit position on the basis of entry contents of the BRFT.

Each forwarding link of the ring topology uses a fast detection technology (such as BFD or a two-layer link fast detection method) to detect its connectivity, and performs status association with the BRFT and the BIER-TE Adjacency in the BIFT configured on the forwarding link, the description of which will be omitted herein since this does not fall within the scope of the present disclosure.

In addition, before this step, the entries (such as BIFT, BRFT, and BTAFT Table) related to the BIER message forwarding needs to be sent to the BFR through a southbound interface (such as NETCONF/RESTCONF/PCEP/BGP-LS), so that the BIER message is forwarded on the BFR.

Since the BIER message in this embodiment is forwarded along the working path (i.e., the direction of the link bit position) under normal circumstances, and is forwarded along the protection ring path (i.e., the direction of the protection ring bit position) when a failure occurs. To distinguish and facilitate the processing of the subsequent forwarding process, the BIER message header can be extended before this step. A newly added field is used to distinguish whether the BIER message is forwarded along the working path (i.e., the direction of the link bit position) or along the protection ring bit position. For example, a P field is added to the header of the BIER message to distinguish whether the BIER message is forwarded along the working path or along the direction of the protection ring bit position. If the BIER message is forwarded along the direction of the protection ring bit position, then the P field flag bit is set, and if the BIER message is along the working path or needs to be deviated from the direction of the protection ring bit position, the P field flag bit is cleared. The newly added P field may be accomplished by using one or more bits of a reserved field of the BIER message header. However any other suitable manners are also possible.

This embodiment also uses the BIER-TE Adjacency fast reroute Table (BIER-TE Adjacency FRR Table, BTAFT), the entry contents of which are described in respect to the Draft-Eckert-BIER-TE-FRR manuscript, as shown in FIG. 24.

As such, when the BIER message is forwarded along the working path, if a BIER Forwarding Router (BFR) detects that a downstream adjacency of a certain forwarding link has a failure (including a link failure or a node failure), the entry contents of the BTAFT (BIER-TE Adjacency FRR Table) is searched for the correlation between the link bit position (BP) of the failure forwarding link and the protection ring bit position. The corresponding entries of Add BitMask and the Reset BitMask of the BTAFT are used to modify the bit string contents of the BIER message. The protection ring bit position of the failure forwarding link is used to replace the link bit position (BP) of the failure forwarding link. In the meanwhile, a newly added field (i.e., a P field) of the BIER message header is set. And then, the BIER message forwarded to the failure point of an opposite end along the protection ring path (i.e., the direction of the protection ring bit position) on the basis of entry content of the BRFT. When an off-ring condition is met, the BIER message is not forwarded continuously along the protection ring path. at the moment, the BIER message is shifted from the protection ring path (the direction of the protection ring bit position) to the normal working path (the direction of the link bit position), so that the failure point can be bypassed by the method and the subsequent forwarding can be carried out according to the original path.

Figure 3:
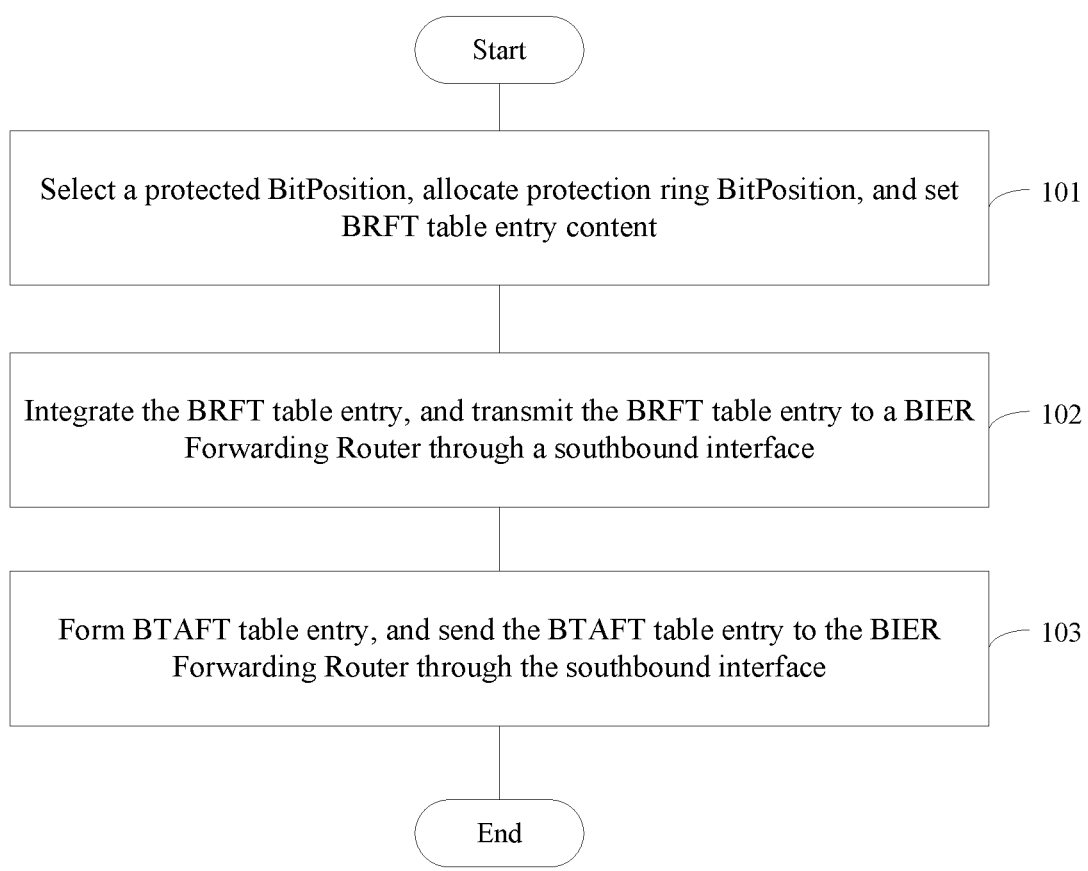
FIG. 3 is an overall flowchart of a failure protection control plane for a BIER-TE according to the present disclosure.

In the BIER-TE architecture, a BIER-TE Controller is mainly used to process control plane information, and issues corresponding configuration information (such as a BIFT, a BRFT, a BTAFT Table, and the like) to a BFR (BIER Forwarding Router) through a southbound interface (NETCONF/RESTCONF/PCEP/BGP-LS, and the like). The following processes are all completed by the Bier-TE Controller, and the general process of control plane is shown in FIG. 3, including nodes 101-103, and described as follows.

At node 101, select a protected BitPosition (i.e., a link bit position of a protected forwarding link), allocate a protection ring BitPosition (i.e., a protection ring bit position), and set BRFT table entry content.

At node 102, integrate the BRFT table entries, and transmit the BRFT table entries to the BIER Forwarding Router through the southbound interface.

At node 103, form the BTAFT table entries, and send the BTAFT table entries to the BIER Forwarding Router through the southbound interface.

Figure 4:
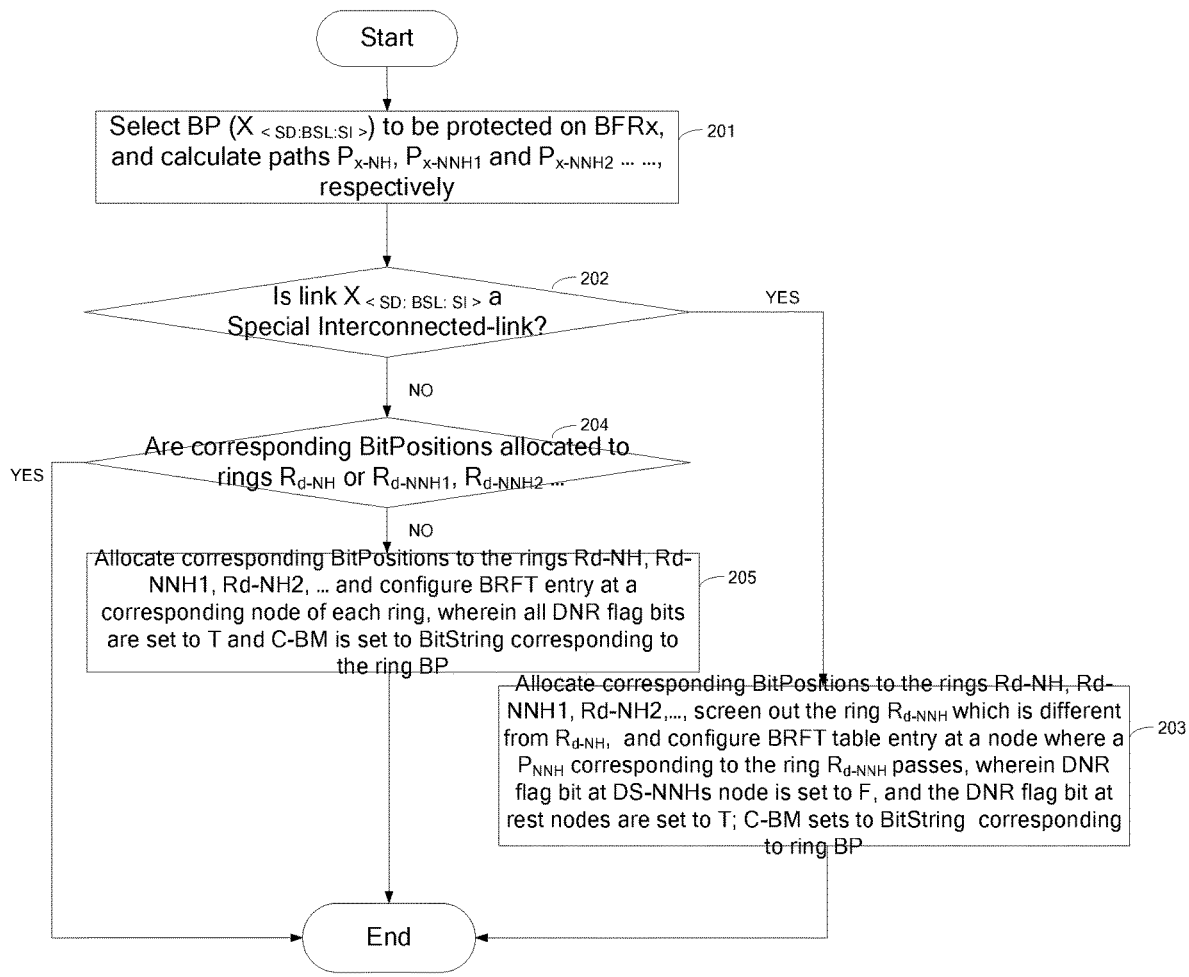
FIG. 4 is a flowchart of protection ring BitPosition allocation and BRFT entry settings for the BIER-TE according to the present disclosure.

Herein, the BIER-TE protection ring BitPosition (i.e., protection ring bit position) allocation and BRFT table entry setting process are shown in FIG. 4, including node 201-node 205, and will be introduced hereinafter.

At node 201, for the BitPosition (i.e., link bit position) needing protection at BFRx (representing a certain protection point of a BIER forwarding router), which is called as $X_{<SD:BSL:SI>}$, calculate paths from BFR to opposite-end nodes adjacent to $X_{<SD:BSL:SI>}$: downstream next-hop (DS-NH) node and downstream next next-hops (DS-NNHs) nodes, respectively, which are called $P_{x-NH}$, $P_{x-NNH1}$ and $P_{x-NNH2}$ ... respectively; then jump to the step (2), wherein the path $P_{x-NH}$ cannot pass through the link to which $X_{<SD:BSL:SI>}$ belongs, and the paths $P_{x-NNH1}$, $P_{x-NNH2}$ ... cannot pass through the link to which $X_{<SD:BSL:SI>}$ belongs and the links between DS-NH and the corresponding DS-NNHs, and wherein the above path can be regards as a segment on a ring along a certain direction (counterclockwise or clockwise);

At node 202, Judge whether the link where $X_{<SD:BSL:SI>}$ is located is a Special Interconnected-link, and if so, go to a node 203; otherwise, jump to a step node 204.

At node 203, for the paths $P_{x-NH}$, $P_{x-NNH1}$ and $P_{x-NNH2}$ ..., sequentially judge whether BitPositions corresponding to <SD:BSL:SI> is allocated to the ring $R_{(d, x-NH)}$ or $R_{(d, x-NNH1)}$, $R_{(d, x-NNH2)}$ ... (d represents the direction, c represents the clockwise direction and a represents the counterclockwise direction) where the paths are located, configure each link on the ring $R_{(d, x-NH)}$ a corresponding BRFT table entry and set the DNR flag bit to T; at least one of the rings $R_{(d, x-NNH1)}$ and $R_{(d, x-NNH2)}$ ... is the same as $R_{(d, x-NH)}$, then screen out a ring $R_{(d, x-NNH)}$ which is different from $R_{(d, x-NH)}$, and configure a BRFT table entry at the node corresponding to the ring $R_{(d, x-NH)}$ where the $P_{x-NNH}$ passes through, wherein the DNR flag bit of the DS-NNHs node is set to F, and the DNR flag bit of the rest nodes are set to T; set C-BM to BitString (adjacent information is the same as BIFT without special processing, the description of which is omitted) corresponding to the ring BP (i.e., the protecting ring bit position); and close the process.

At node 204, for the paths $P_{x-NH}$, $P_{x-NNH1}$ and $P_{x-NNH2}$ ..., sequentially judge whether a BitPosition corresponding to <SD:BSL:SI> is allocated to a ring $R_{d-NH}$ or $R_{(d, x-NNH1)}$, $R_{(d, x-NNH2)}$ ... (d represents a direction, c represents clockwise and a represents anticlockwise) where the path is located, and if BitPosition is allocated in the direction, then close the process; otherwise, go to the step node 205.

At node 205, allocate corresponding BitPositions to the rings R (d, x-NH), R (d, x-NNH1), R (d, x-NNH2) ... (at least one of the rings R (d, x-NNH1) and R (d, x-NN-H2) ... is the same as R (d, x-NH), and only one BitPosition needs to be allocated), and configure each link on ring R (d,x-NH), R (d,x-NNH1) and R (d,x-NNH2) ... with corresponding BRFT entries, wherein all DNR flag bits are set to T (i.e., all closed rings); set C-BM to BitString (adjacent information is the same as BIFT without special processing, the description of which is omitted) corresponding to the ring BP (i.e., the protection ring bit position); and close the process.

Figure 5:
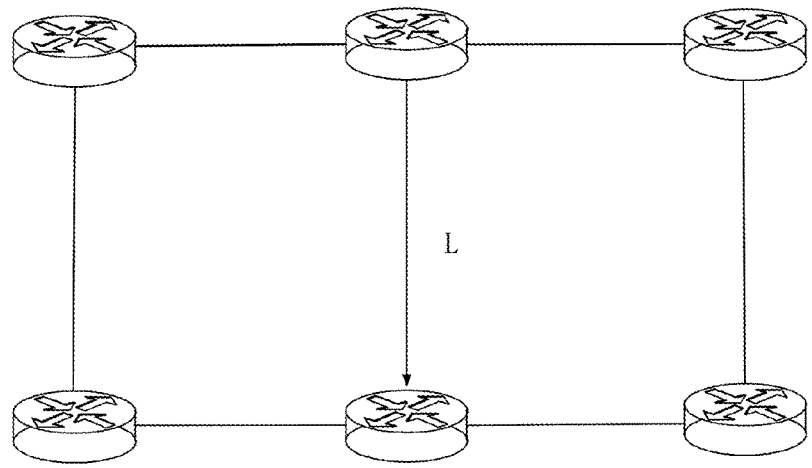
FIG. 5 is a dual-ring dual-node topology diagram according to the present disclosure.

In the above process, the Special Interconnected-link is a term proposed by the present disclosure. For a link where two rings intersect, the link is a Special Interconnected-link if the number of DS-NNH nodes thereof is greater than or equal to 2. In the present disclosure, TE-FRR protection of the Special Interconnected-link is different from a common link, and link bit positions (BitPositions) of the Special Interconnected-link corresponding to one or some protection ring bit positions are not shared (the protection ring is a non-closed ring, and the corresponding entry flag DNR information has an F setting). The protection rings of other BitPositions are closed rings (the entry flag DNR information corresponding to all links on the ring is set to T), and can be shared. One of the typical topologies where there is a Special Interconnected-link is a dual-ring dual-node topology, as shown in FIG. 5, where the link L is a Special Interconnected-link.

Figure 6:
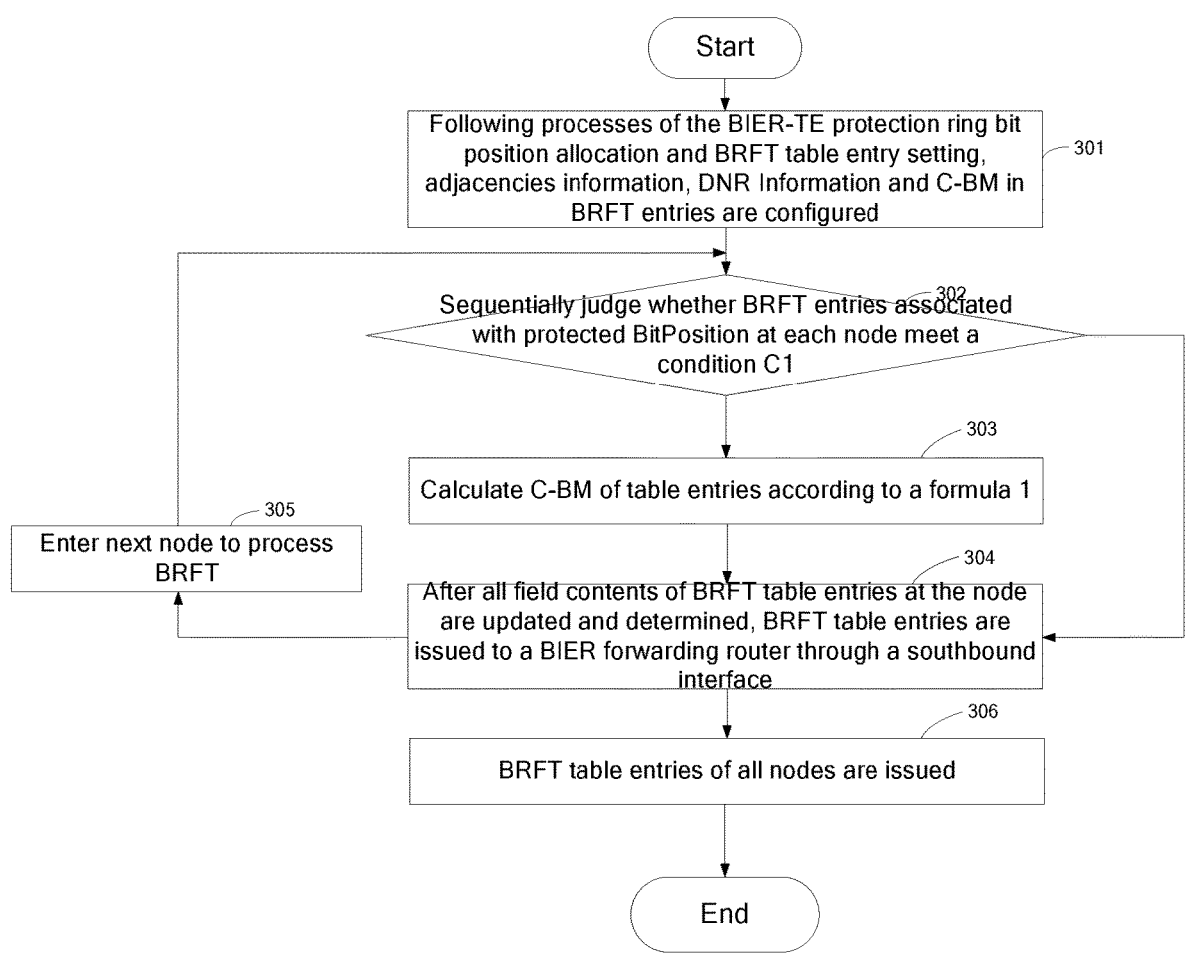
FIG. 6 is a flowchart of BRFT entry integration and distribution according to the present disclosure.

The protection scheme provided by the present disclosure is related to topology. Sometimes a plurality of protection rings are needed. There may be pieces of BRFT entries for some BFRs (the nodes passed by the plurality of rings). Proper entries need to be selected and forwarded according to the entry contents thereof in the process of message forwarding. A process for integration and issuance of the BRFT entries is shown in FIG. 6, including node 301 to node 306, which will be described hereinafter.

At node 301, following the above process of the BIER-TE protection ring BitPosition allocation and BRFT table entry setting, the adjacency information, DNR flag Information and C-BM in the BRFT entries have been configured.

At node 302, sequentially judge whether the BRFT entries associated with the protected BitPosition (i.e., the link bit position) at each node meet the condition C1, and if so, go to the node 303; otherwise jump to the step node 304.

At node 303, calculate the C-BM of the table entries according to a formula 1.

At node 304, after all the contents of fields of BRFT table entries at the node are updated and determined, send the BRFT table entries to a BIER Forwarding Router through a southbound interface.

At node 305, jump to the step node 302, proceed with a processing flow for a next node.

At node 306, when the BRFT table entries of all the nodes have been issued, close the process.

In the above process, the contents of condition C1 are as follows.

The following 2 items need to be satisfied simultaneously:
1. the number of table entries having a DNR flag of T on a BFR link is more than 1, and
2. the BFR link is a non-PLR (Point of Local-Repair), or the adjacent interfaces in the related table entries are the same.

Indexes x, y, z are used to represent entry indexes of BRFT, associated with a protected BitPosition (i.e., a link bit position) on a certain BFR, and the C-$BM_{index}$ represents the C-BM of the entry, assuming that the x, y, z entries on the BRF satisfy the condition C1, then the equation 1: C-$BM_{x/y/z}$=C-$BM_x$|C-$BM_y$|C-$BM_z$.

Figure 7:
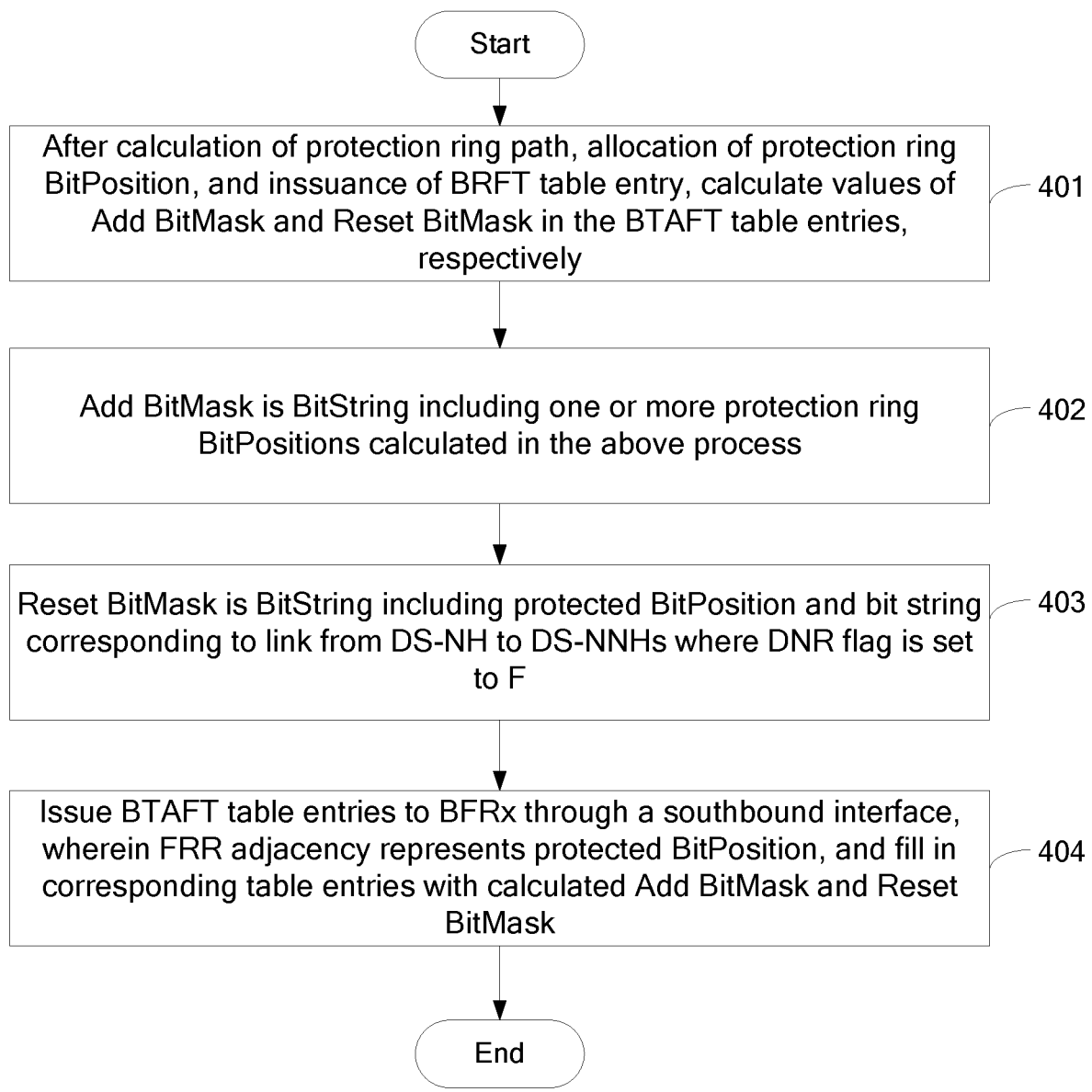
FIG. 7 is a flowchart of the BTAFT entry formation according to the present disclosure.

Following the above process of ring BitPosition (i.e., protection ring bit position) allocation procedure, a process for BTAFT entry formation is shown in FIG. 7, including node 401 to node 404, which will be described hereinafter.

At node 401, after calculating the protection ring path, allocating the protection ring BitPosition and issuing the BRFT table entry issuance, calculate values of Add BitMask and Reset BitMask in the BTAFT table entries, respectively.

At node 402, Add BitMask is a bit string (BitString) comprised of one or more protection ring BitPositions calculated in the above process.

At node 403, Reset BitMask is a bit string (BitString) comprised of the protected BitPosition (i.e., link bit position of protected forwarding link) and the BitPosition corresponding to the link from DS-NNHs to DS-NH where the DNR flag bit is F.

At node 404, issue BTAFT table entries to BFRx through a southbound interface, wherein FRR adjacency represents protected BitPosition, and fill corresponding table entries with the calculated Add BitMask and Reset BitMask.

Figure 8:
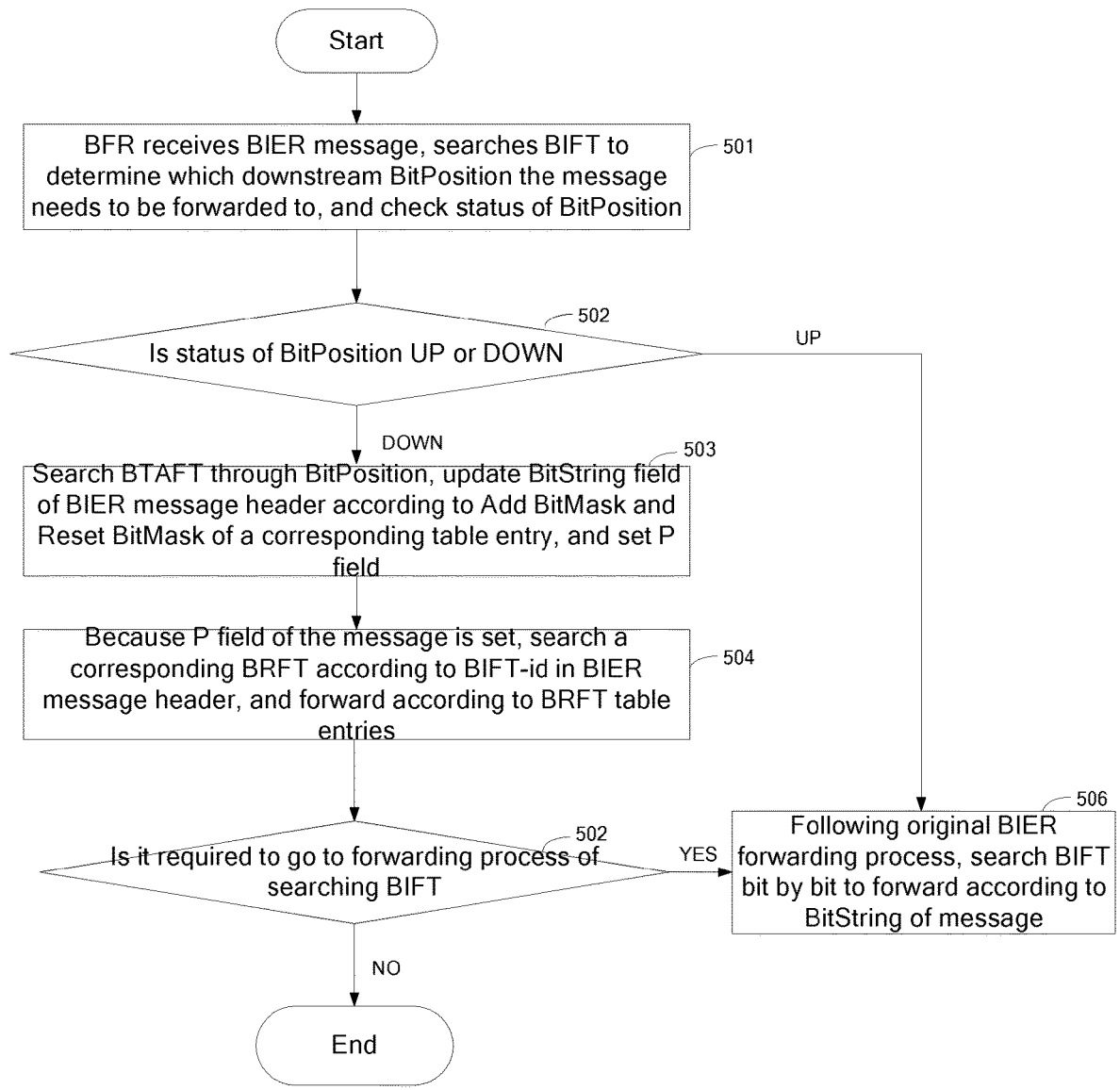
FIG. 8 is a flowchart of the BIER-TE FRR forwarding according to the present disclosure.

When a BIER message is forwarded, according to whether the newly added field at the BIER message header is set, it can be determined the original BIFT or the newly added BRFT is forwarded. When a network failure occurs in the BIER-TE (including a link failure or a node failure), the status of the associated BitPosition (i.e., a link bit position) is DOWN. In order to implement fast failure protection, the original BIER forwarding process needs to be slightly modified, the process of which is shown in FIG. 8, including node 501 to node 506 and will be specifically discussed hereinafter.

At node 501, receive the BIER message through the BFR, and search the BIFT in conjunction with the BitString in the message to determine which downstream BitPosition (i.e., the link bit position) the message needs to be forwarded to.

At node 502, check a status of BitPosition (i.e., the link bit position) is UP or DOWN, respectively.

At node 503, if the status of BitPosition (i.e., the link bit position) is DOWN, search BTAFT through the BitPosition (i.e., the link bit position), update a BitString field of a BIER message header according to Add BitMask and Reset Bit-Mask of a corresponding table entry, and set a P field; if the status is UP, then jump to node 506.

At node 504, since the P field of the message is set, search a corresponding BRFT according to the BIFT-id in the BIER message header, and forward according to BRFT table entries.

At node 505, if required to go to forwarding process of searching BIFT, then go to node 506; otherwise, close the forwarding process on the BFR.

At node 506, according to the original BIER forwarding process, search BIFT bit by bit to forward according to the BitString of the message.

Figure 9:
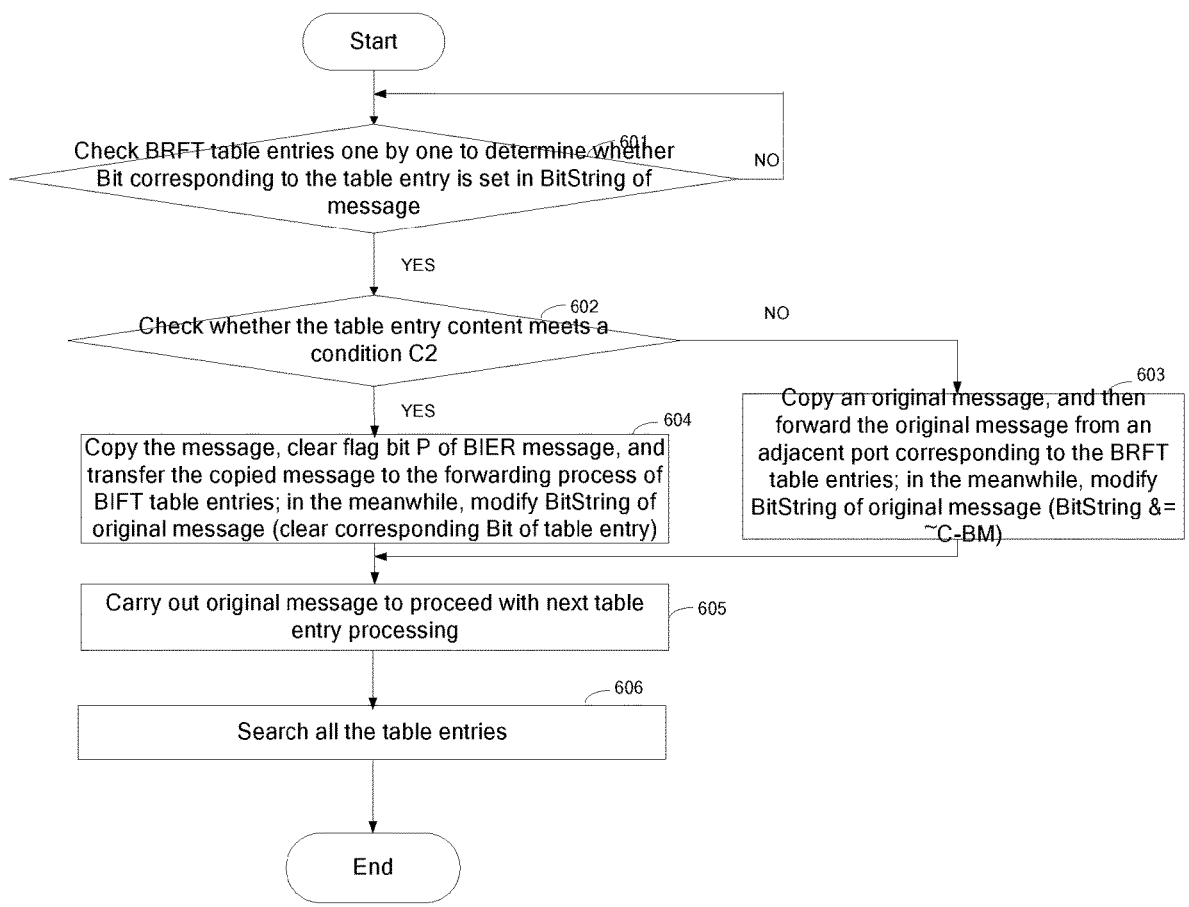
FIG. 9 is a flowchart of the BRFT forwarding according to the present disclosure.

Herein, the process of searching the BRFT table to forward may be completed by steps of: according to a bit string in the BIER message header, copying and forwarding bit-by-bit, and checking the table entry contents of the BRFT one by one to detect whether the current table entries of the BRFT meets a condition of off protection ring; if meets the condition of off protection ring, then clearing the setting of the newly added field at the BIER message header, copying the BIER message, and searching the BIFT to forward; if not meet the condition of off protection ring, directly copying the BIER message, and forwarding the BIER message from the adjacent port corresponding to the current table entries of the BRFT. The forwarding process for searching the BRFT table is shown in FIG. 9, including node 601 to node 606, which will be discussed hereinafter.

At node 601, check BRFT table entries one by one, to detect whether the Bit corresponding to the table entry is set in the BitString message, if the Bit is set, go to node 602, and if the Bit is not set, return to the node 601 to proceed with the processing for the next table entry.

At node 602, check whether the table entry content meets a condition C2, if the table entry content does not meet the condition C2, then go to the node 603; otherwise, jump to the node 604.

At node 603, copy an original message, and then forward the original message from an adjacent port corresponding to the BRFT table entries; meanwhile, modify the original message BitString (BitString &=~C-BM), and then jump to node 605.

At node 604, copy the original message and clear a flag bit P of the BIER message, such that the copied message is transferred to a forwarding process of BIFT table entries; meanwhile, modify the original message BitString (clear the table entries corresponding to the bit), and then go to the node 605.

At node 605, return the original message to the node 601, and proceed with next table entry processing.

At node 606, as all the table entries are completely searched, close the process.

The contents of the determination condition C2 in the above process are as follows.

At least one of the following conditions should be satisfied: 1. the status of the table entry in the BRFT is DOWN; and 2. DNR flag bit of the entry in BRFT is F.

Second Embodiment

Figure 10:
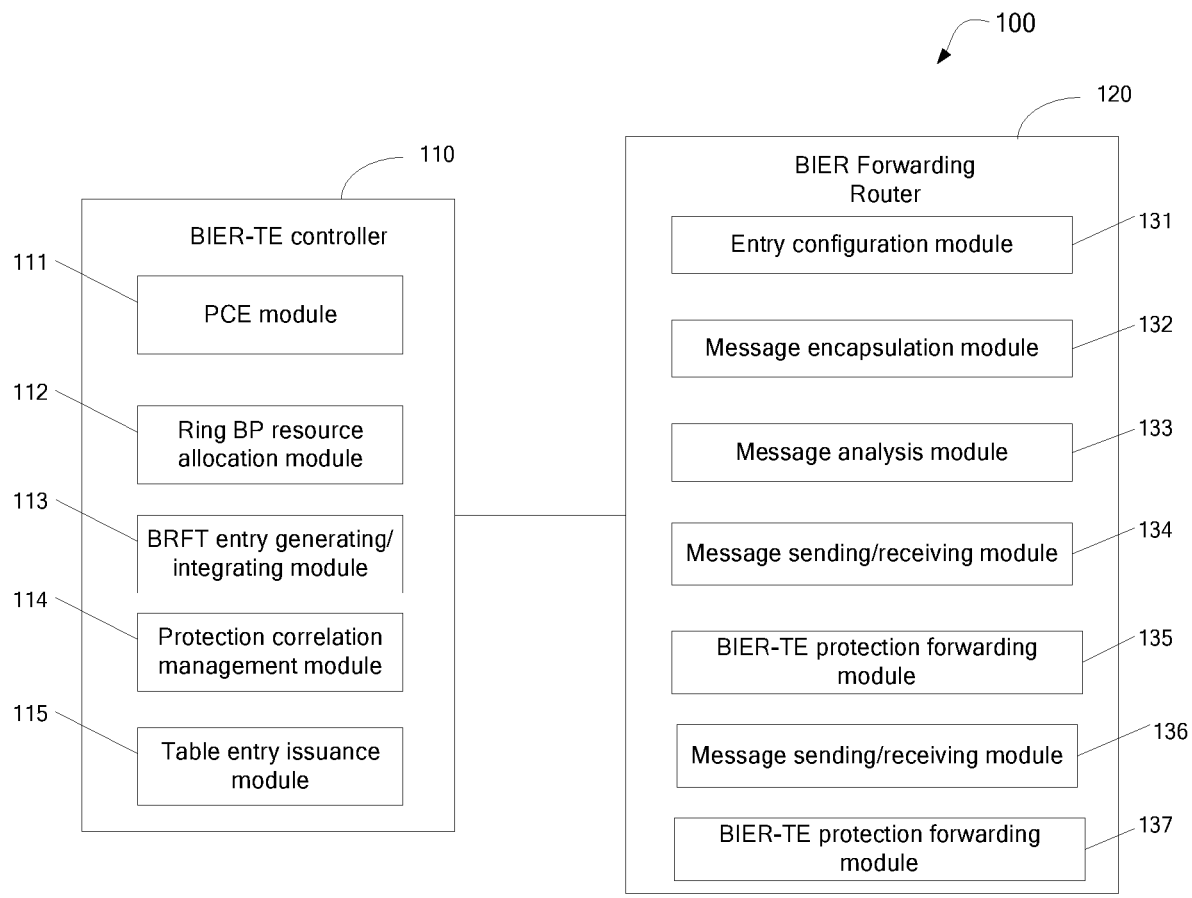
FIG. 10 is a block diagram of a network failure protection system according to a second embodiment of the present disclosure.

As shown in FIG. 10, the present embodiment proposes a system 100 for network failure protection in BIER-TE. The system 100 includes a BIER-TE controller 110 and a BIER forwarding router 120.

The BIER-TE controller 110 is mainly configured to allocate a link bit position and a protection ring bit position for each forwarding link of a ring topology, wherein a direction of the link bit position is set to be opposite to a direction of the protection ring bit position, and newly add a BIER ring forwarding table (BRFT), wherein the BRFT is configured to store adjacent forwarding table entry related to forwarding along the direction of the protection ring bit position, and send the table entry related to forwarding of BIER messages to the BIER forwarding router through a southbound interface.

The BIER-TE controller 110 mainly includes a PCE module 111, a ring BP resource allocation module 112, a BRFT entry generation/integration module 113, a protection correlation management module 114 and a table entry issuance module 115.

The PCE module 111 is configured to calculate a protection ring path of each forwarding link and determine a protection ring bit position corresponding to the protection ring path. The specific path calculation method and the protection ring bit position determination method are not interested and there is no more explanation thereof in the present disclosure.

The ring BP resource allocation module 112 is configured to allocate a protection ring bit position for each forwarding link, and determine whether the protection ring bit position can be shared, details of which can be referenced to subsequent embodiments.

The BRFT entry generation/integration module 113 is configured to generate an initial BRFT table according to the allocation of the protection ring bit position, and integrate the C-BM information of the BRFT table according to a BRFT integration method, details of which can be referenced to subsequent embodiments.

The protection correlation management module 114 is configured to manage the correlation between the link bit position and the protection ring bit position of each forwarding link.

The table entry issuance module 115 is configured to issue the table entries related to forwarding of BIER message to the BIER forwarding router 120 through the southbound interface.

The BIER Forwarding Router 120 is mainly configured to receive table entries related to BIER message forwarding sent from the BIER-TE controller 110 through the southbound interface; when the BIER message is forwarded along the ring topology, if it is detected that a downstream adjacency of the ring topology fails, then search entry content of a BIER-TE adjacency fast rerouting table (BTAFT) to find a correlation between a link bit position of a failure forwarding link and a protection ring bit position, and forward the BIER message to an opposite end failure point along the direction of the protection ring bit position by combining the table entry content of the BRFT.

The BIER Forwarding Router 120 mainly includes the following modules: an entry configuration module 121, a message encapsulation module 122, a message analysis module 123, a message sending/receiving module 124, a BIER-TE protection forwarding module 125, a BRFT forwarding module 126 and a fast detection module 127.

The entry configuration module 121 is configured to receive table entries related to forwarding of BIER message sent from the BIER-TE controller 110, through a southbound interface, such as a BRFT, a BTAFT, a BIFT, and the like.

The message encapsulation module 122 is configured to encapsulate the BIER message, for example, including modifying the bit string content of the BIER message and setting a newly added field in the BIER message header. Encapsulation of the BIER message includes: when a failure is detected through a fast detection technology, a bit string in the BIER message header can be modified, and a P flag bit is set; when the BRFT table is searched to forward, the bit string of the original message is modified; when the condition of off protection ring C2 is satisfied, the P field of the message header needs to be clear (see subsequent embodiments for details).

The message analysis module 123 is configured to extra analyze whether the newly added field in the BIER message header is set or not.

The message sending/receiving module 124 is configured to send and receive the BIER message, wherein after being processed by a BIER message sending/receiving module and the message encapsulation module 122, the BIER message is sent to downstream equipment; and the BIER message sent upstream is received to deliver the BIER message to other modules for further processing.

The BIER-TE protection forwarding module 125 is configured to determine, according to a setting condition of a newly added field in the BIER message header, whether the BIER message is forwarded along the direction of the link bit position or the direction of the protection ring bit position, search different tables to forward according to the setting condition of a P flag bit in the BIER message header, wherein if the P flag bit is set, the BRFT is searched firstly and the BIFT is searched if necessary, or the original forwarding process for searching the BIFT is carried out if the P flag bit is not set.

The BRFT forwarding module 126 is configured to perform bit-wise copying and forwarding according to the newly added field in the BIER message header and in combination with the entry contents of the BRFT, wherein the bit-wise copying and forwarding according to the newly added field of the BIER message header need to be performed in combination of C-BM, table entry status (Status) and the like.

The fast detection module 127 is configured to perform a connectivity detection for each forwarding link in the ring topology through the fast detection technology. When a failure is detected or a failure is recovered, the status of the adjacent entry associated therewith changes, which is not within the scope of the present disclosure and is not described in detail.

Third Embodiment

The present embodiment provides a storage medium for a computer-readable storage, storing one or more programs, wherein the one or more programs are executable by one or more processors to implement the steps of the method for network failure protection in BIER-TE according to the first embodiment.

Fourth Embodiment

Figure 11:
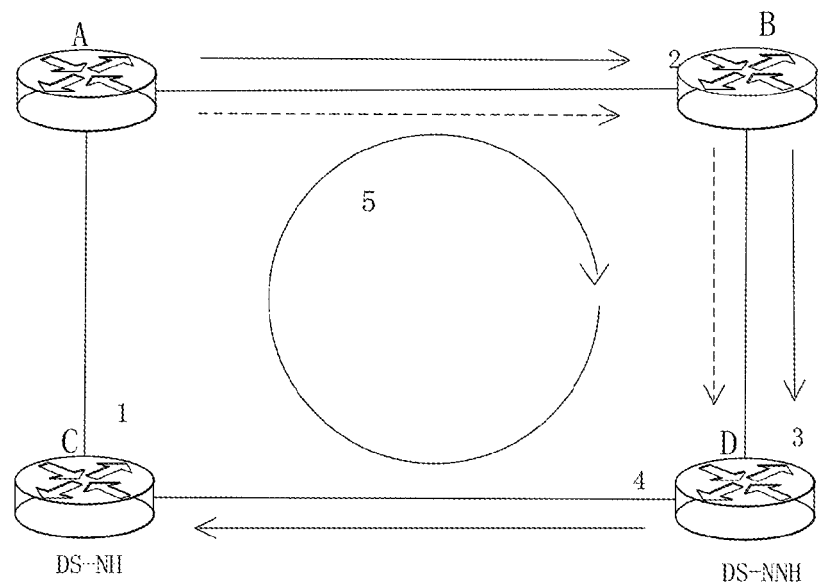
FIG. 11 is a schematic structural diagram of a single ring topology according to a fourth embodiment of the present disclosure.

The embodiment further explains the implementation process of allocation of protection ring bit position in conjunction with the actual situation. Specifically, by taking a single ring topology as shown in FIG. 11 as an example, the allocation process of protection ring bit position (BitPosition) in this scenario is discussed:

(1) BitPosition 1 (i.e., a link bit position) on the link A→C is selected at the node A for protection, wherein DS-NH is a node C and DS-NNH is a node D, and it is calculated that $P_{A-C}$ is A→B→D→C and $P_{A-D}$ is A→B→D, as shown by a solid line with an arrow and a dashed line with an arrow in FIG. 11;

(2) the link A→C is a non-special-interconnected-link, and the $P_{A-C}$ and the $P_{A-D}$ are located in the same ring with a direction of A→B→D→C→A by clockwise;

(3) if the ring (in the clockwise direction) has not been allocated BP under the condition of <SD:BSL:SI>, then BitPosition 5 (i.e., the protection ring bit position) is allocated to the ring in the clockwise direction, and BRFT table entries are set at the nodes A, B, C, D according to the topology, DNR is set to be T. The BRFT table entries at the node A are as shown in FIG. 25, and the rest of the nodes are similar to the BRFT table entries.

Fifth Embodiment

Figure 12:
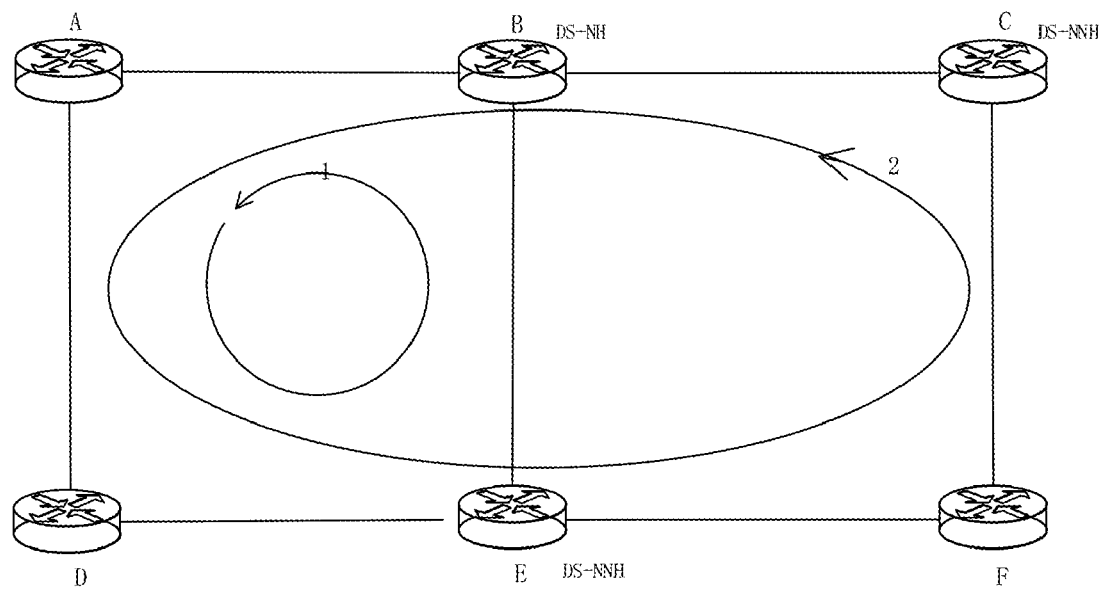
FIG. 12 is a schematic structural diagram of a dual-ring topology according to a fifth embodiment of the present disclosure.

This embodiment further explains the integration and formation process of BRFT entries in combination with actual situations. Specifically, taking a dual-ring topology as shown in FIG. 12 as an example, in a scenario of the dual-ring topology, FRR is configured for the BitPosition (i.e., the link bit position) where a link A→B is located. Two protection ring BitPositions 1 and 2 are allocated according to the protection ring bit position allocation procedure (indicated by small ring lines and large oval ring lines in FIG. 12, respectively). The BRFT entries related to the protected BitPosition (i.e., the link bit position where link A→B is located) on each node are shown in FIG. 26.

Taking this as an example, a BRFT entry integration and issuance process is introduced by the following steps.

(1) The node A and the node D are provided with 2 BRFT entries respectively, and if the condition C1 is met (the number of entries is more than 1 with the same adjacency port), then the C-BM of the 2 entries=0011 can be calculated according to the formula 1.

(2) The node B and the node E are provided with 2 BRFT entries respectively, and if the condition C1 is met (the number of entries is more than 1 and the nodes are non-PLR nodes), then the C-BM of the 2 entries=0011 can be calculated according to the formula 1.

(3) The node C and the node F are provided with 1 BRFT entry respectively, which does not meet the condition C1. Thus, the processing is not needed. C-BM=0010.

(4) Through integration, the final content of the BRFT entries at each node is shown in FIG. 27, and these entries are sent to each node through the southbound interface.

Sixth Embodiment

Figure 13:
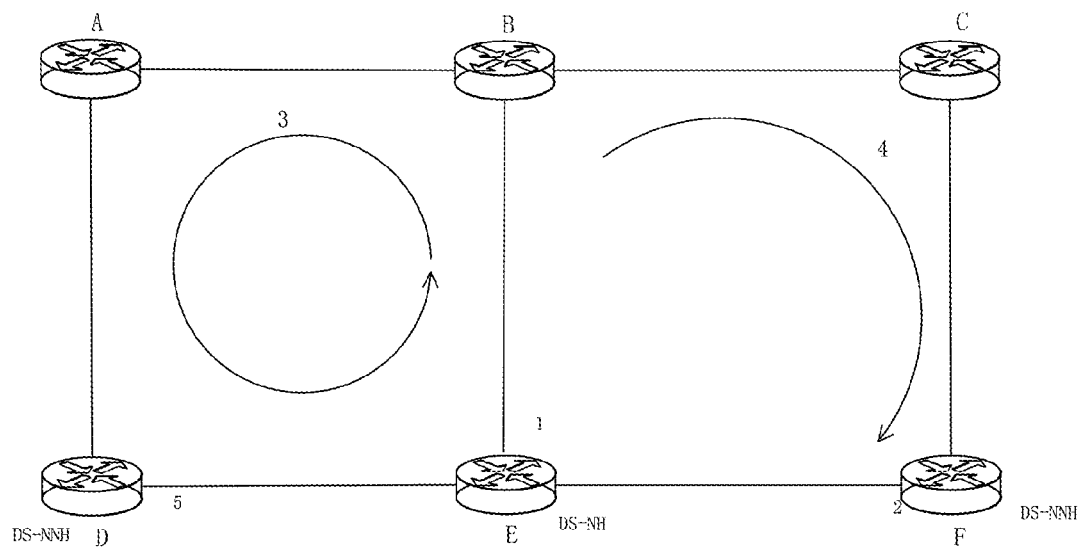
FIG. 13 is a schematic structural diagram of a dual-ring topology according to a sixth embodiment of the present disclosure.

The embodiment further explains the forming process of BTAFT entries in combination with actual situations. Specifically taking a dual-ring topology as shown in FIG. 13 as an example, in a scenario of the dual-ring topology, FRR is configured for the BitPosition 1 where a link B→E is located, and two protection ring BitPositions 3 and 4 are allocated according to the protection ring bit position allocation procedure (BitPosition 3 is a left closed ring in the counterclockwise and BitPosition 4 is a right non-closed ring in the clockwise, in FIG. 13). Taking this as an example, a BTAFT entry forming procedure is introduced:

(1) Add BitMask is a bit string including two ring BitPositions, which is 1100;

(2) Reset BitMask is a bit string including protected BitPosition 1 and Bitposition 2 on a link E→F (DS-NH is the node E, and DNR flag at the node F is F), which is 0011;

(3) Finally, the BTAFT entry contents formed at the node B are shown in FIG. 28, and the BTAFT entries are delivered to the node B through the southbound interface.

Seventh Embodiment

The present embodiment proposes a method for distinguishing whether a BIER message travels along a working path (i.e., forwarding along the direction of the link bit position) or a protection ring path (i.e., forwarding along the direction of the protection ring bit position). Specifically, a P field flag bit is added in a BIER message header, where the flag bit setting indicates that the message travels along an annular protection ring path; if the message goes along the working path or needs to be separated from the annular protection ring path, then the P flag bit needs to be cleared.

FIG. 29 shows a BIER header encapsulation method, which uses a bit of the reserved field Rsv as the P flag field. Other packaging methods are not illustrated herein.

Eighth Embodiment

Figure 14:
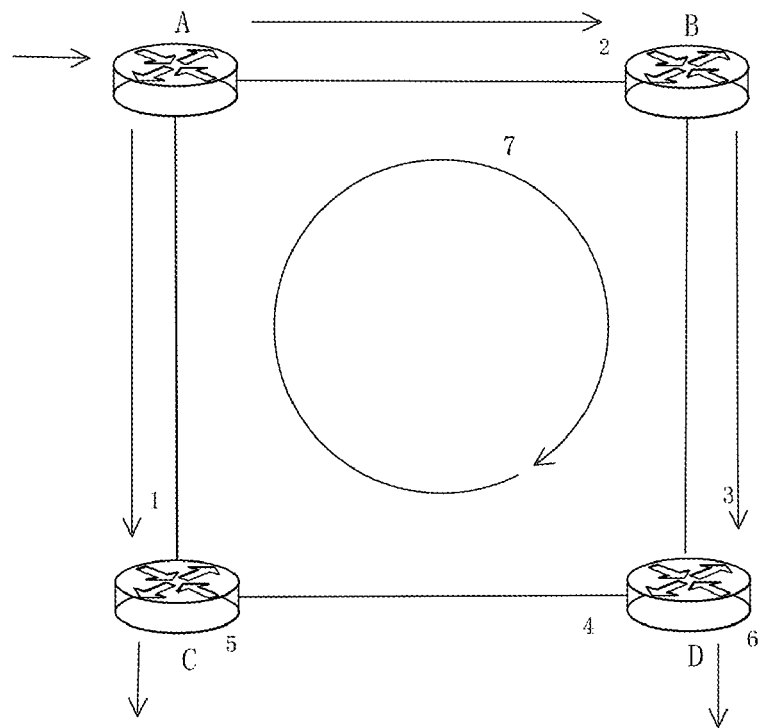
FIG. 14 is a schematic structural diagram of a single ring topology according to an eighth embodiment of the present disclosure.

In this embodiment, a failure protection process under a single ring topology scenario is further described in conjunction with an actual situation. FIG. 14 shows a single ring topology and related BitPosition. BitPosition 1 on an A→C link configures TE-FRR protection. According to the present disclosure, a protection ring of BitPosition 1 is a clockwise ring, and BitPosition 7 is allocated to the protection ring.

For example, there is a multicast service stream, wherein the BFIR is the node A, and the BFER is nodes C and D; under a normal network condition, the traffic paths are A→C, A→B→D (see the arrowed straight line in FIG. 14).

Failure Scenario 1—Link Failure:

When the link A→C fails, the message forwarding process includes the following steps.

(1) The node A receives the BIER message, searches the BIFT according to the BitString (00110111) of the message with matched BP of 1 and 2.

(2) Because the BP2 table entry is normal, the duplicate message is forwarded to the downstream node B according to the table entry adjacency information (the subsequent message is performed according to the original forwarding process, which is not involved in the disclosure and is not described for details); when the link A→C fails, the associated BP1 status is Down, the BTAFT table is searched and the message BitString is updated (Add BitMask=01000000 and Reset BitMask=00000001). The updated BitString=01110100, and the P field in the message header is set.

(3) Because the P field is set, the corresponding BRFT table entry needs to be searched. The table entries corresponding to BP7 in BRFT of the node A is matched, and the condition C2 is not met (i.e., the forwarding is required to be continuously carried out along the protection ring).

(4) Copy a message, wherein the BitString is still 01110100 without modification, and forward the message to a downstream node B.

(5) The node B (a node D is the same as the node B) receives two BIER messages, wherein the P field in one message is not set to carry out the original forwarding process (the message is forwarded to the node D, and the BIER message header is stripped); and the P field in the other message is set (the message travels a protection ring path) to operate the same processing flow with the node A. Then BRFT table entries are searched with the table entry corresponding to BP7 matched. The condition C2 is not met. Then the message (BitString=01110100) is copied and forwarded to a downstream node D (node C)

(6) The node C receives a BIER message, P field is set, and BRFT table entries are searched with table entry corresponding to BP7 matched. The associated BP7 status is DOWN due to failure of the link A→C, and thus the condition C2 is satisfied.

(7) Copy the message, clear the setting of P field (BitString=01110100), and turn to a BIFT forwarding process. Table entries corresponding to BP5 of BIFT are matched. Because the type is local-decap, the BIER message header needs to be stripped from the message at the node C. The BIER forwarding process is closed. The others setting bits in the BitString has no matching table entries in the BIFT.

Figure 15:
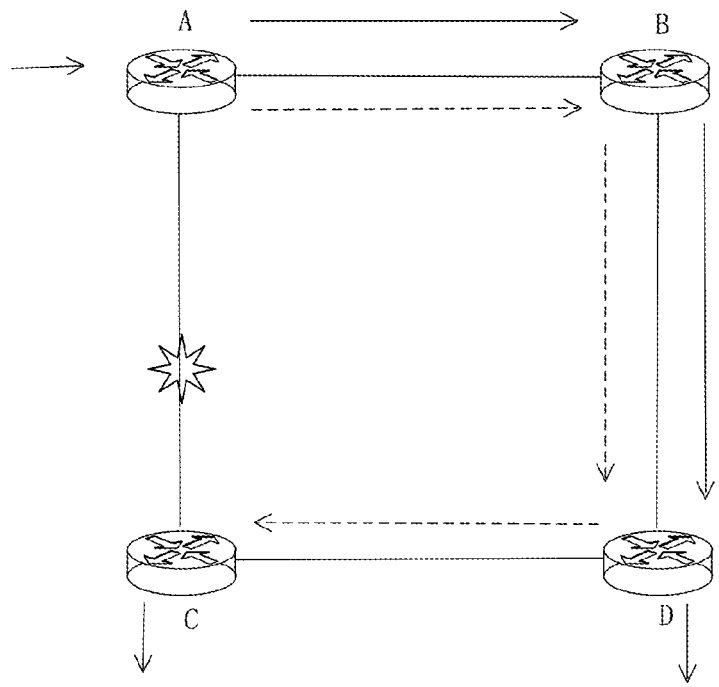
FIG. 15 is a schematic diagram of a multicast service traffic path when a link of the single-ring topology shown in FIG. 14 fails.

In the case of the above failure, the multicast service traffic paths are shown in FIG. 15 with arrowed straight lines, where solid lines indicate that the multicast service traffic path which is not affected by the failure, and dotted lines indicate that the protection ring path used for replace the A→C path.

Failure Scenario 2—Node Failure:

When the node C fails, the forwarding process includes the following steps.

(1) The forwarding process at the node A, the node B is the same as the scenario for the A→C link failure.

(2) The node D receives two BIER messages, wherein the P field in one message is not set to carry out the original forwarding process and the BIER message header is stripped; and the P field in the other message is set (the message goes through a protection ring path) to operate the same processing flow with the node A. The BRFT table entries searched with the table entries corresponding to BP7 matched. The condition C2 is met because the node C has a fault and the status is DOWN.

(3) Copy the message, clear the setting of P field (BitString=01110100), and turn to a BIFT forwarding process. Table entries corresponding to BP5 in the BIFT are matched. Because the type is local-decap, the BIER message header needs to be stripped from the message at the node D. The BIER forwarding process is closed. The others setting bits in the BitString has no matching table entries in the BIFT.

Figure 16:
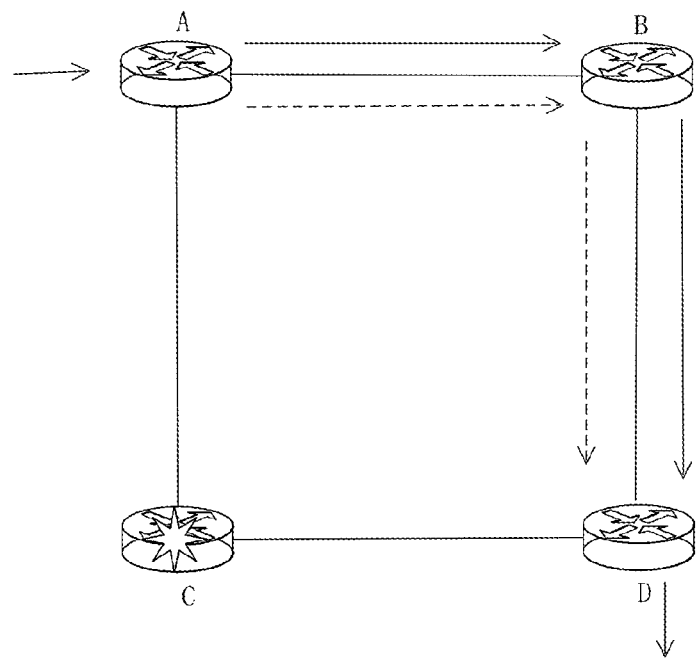
FIG. 16 is a schematic diagram of a multicast service traffic path when a node of the single-ring topology shown in FIG. 14 fails.

In the case of the above failure, the multicast service traffic paths are shown in FIG. 16 with arrowed straight lines, where solid lines indicates that the multicast service traffic path is not affected by the failure, and dotted lines indicates that the protection ring path used for replace the failure node.

Ninth Embodiment

Figure 17:
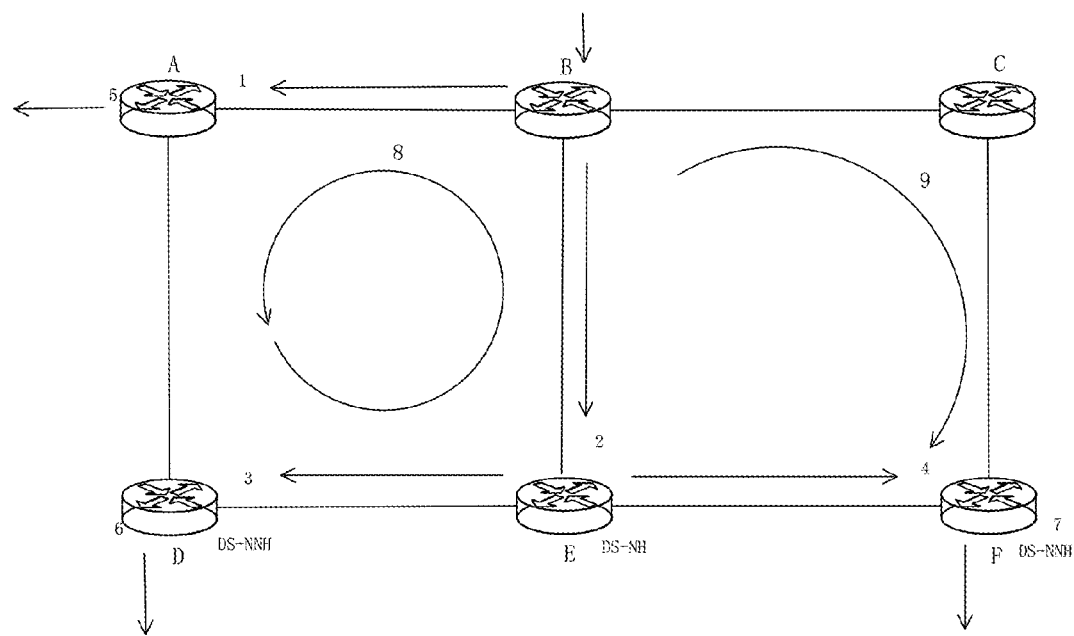
FIG. 17 is a schematic structural diagram of a dual-ring topology according to a ninth embodiment of the present disclosure.

In this embodiment, a failure protection process under a dual-ring topology scenario 1 is further described in combination with an actual situation, especially under the dual-ring topology as shown in FIG. 17. In the dual-ring topology scenario, BP2 on a link B→E (specific-interconnected-link) is configured with TE-FRR protection. According to the present disclosure, protection rings BP 8 and 9 are allocated to a link B→E (in FIG. 17, BP8 is a left closed ring in the counterclockwise direction, and BP9 is a right non-closed ring in the clockwise direction).

For example, there is a multicast service stream, wherein the BFIR is the node B, and the BFER is a node A, a node D, a node F; under a normal network condition, the traffic flow paths are B→A, B→E→D, B→E→F (see the arrowed straight line shown in FIG. 17).

Failure Scenario 1—Link Failure:

When the link B→E fails, the message forwarding process includes the following steps.

(1) The node B receives the BIER message, searches the BIFT according to the BitString (01111111) of the message with matched BP of 1 and 2.

(2) Because the BP1 table entry is normal, the duplicate message is forwarded to the downstream node A according to the table entry adjacency information (the subsequent message is performed according to the original forwarding process, which is not involved in the disclosure and is not described for details); and when the link B→E fails, the associated BP2 status is Down, the BTAFT table is searched and the message BitString is updated (AddBitMask=110000000, ResetBitMask=00001010). The updated BitString=111110100, and the P field in the message header is set.

(3) Because the P field is set, the corresponding BRFT table entries need to be searched. The table entries corresponding to BP 8 and BP 9 in BRFT of the node B are matched, which do not meet the condition C2 (i.e., forwarding along the protection ring is required).

(4) Copy a message, wherein the BitString is still 111110100 without modification, and forward the message to a downstream node A and a node C through different adjacent ports, respectively.

(5) The node A (the node D is the same as the node A) receives a BIER message (the message travels a protection ring path) with the P field set. The BRFT table entries are searched with the table entry corresponding to BP8 matched. The condition C2 is not met. The message (BitString=111110100) is copied and forwarded to a downstream node E.

(6) The node E receives the BIER message, the P field is set, and BRFT table entries are searched with the table entry corresponding to BP8 matched. The associated BP8 status is DOWN due to failure of the link B→E, and thus the condition C2 is satisfied.

(7) Copy the message, clear the setting of P field (BitString=111110100), and turn to a BIFT forwarding process, wherein the table entries corresponding to BP3 in the BIFT is matched and the message is forwarded to the node D from the corresponding adjacent port (BitString=111110000, and the subsequent process is the original BIFT forwarding process, which is not involved in the disclosure and is not described for details).

(8) Following step (4), the node C receives the BIER message (the message travels a protection ring path) with the P field set. The BRFT table entries are searched with the table entry corresponding to BP9 matched. The condition C2 is not met, and the message (BitString=111110100) is copied and forwarded to the downstream node F.

(9) The node F receives the BIER message with the P field set. The BRFT table entries are searched with the table entries corresponding to BP9 matched, and the table entry for DNR is F. Thus, the condition C2 is met.

(10) Copy the message, clear the setting of P field (BitString=111110100), and turn to a BIFT forwarding process, wherein the table entries corresponding to BP7 in the BIFT are matched. Because the type is local-decap, the message needs to strip a BIER message header at the node F. The BIER forwarding process is closed. The others setting bits in the BitString have no matching table entries in the BIFT.

Figure 18:
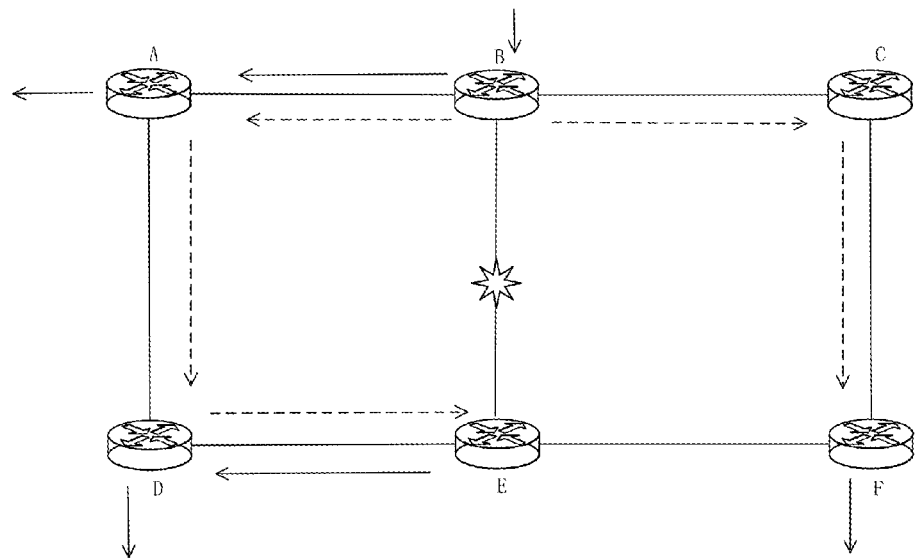
FIG. 18 is a schematic diagram of multicast service traffic path when a link of the dual-ring topology shown in FIG. 17 fails.

In the case of the above failure, the multicast service traffic paths are shown in FIG. 18 with arrowed straight lines, where solid lines indicate that the multicast service traffic path is not affected by the failure, and dotted lines indicate that the protection ring path used for replace the failure link.

Failure Scenario 2—Node Failure:

When the node E fails, the forwarding process includes the following steps.

(1) The forwarding process at the node A, the node B, the node C and the node F is the same as the scenario for the B→E link failure.

(2) The node D receives the BIER message with the P field set (the message travels a protection ring path). The BRFT table entries are searched with the table entries corresponding to BP8 matched. The status of the node E is DOWN due to the failure of the node E. Thus the condition C2 is met.

(3) Copy the message, clear the setting of P field (BitString=111110100), and turn to a BIFT forwarding process, wherein the table entries corresponding to BP6 in the BIFT are matched. Due of the type of local-decap, the BIER message header needs to be stripped from the message at the node D. Then the BIER forwarding process is closed. The others setting bits in the BitString has no matching table entries in the BIFT.

Figure 19:
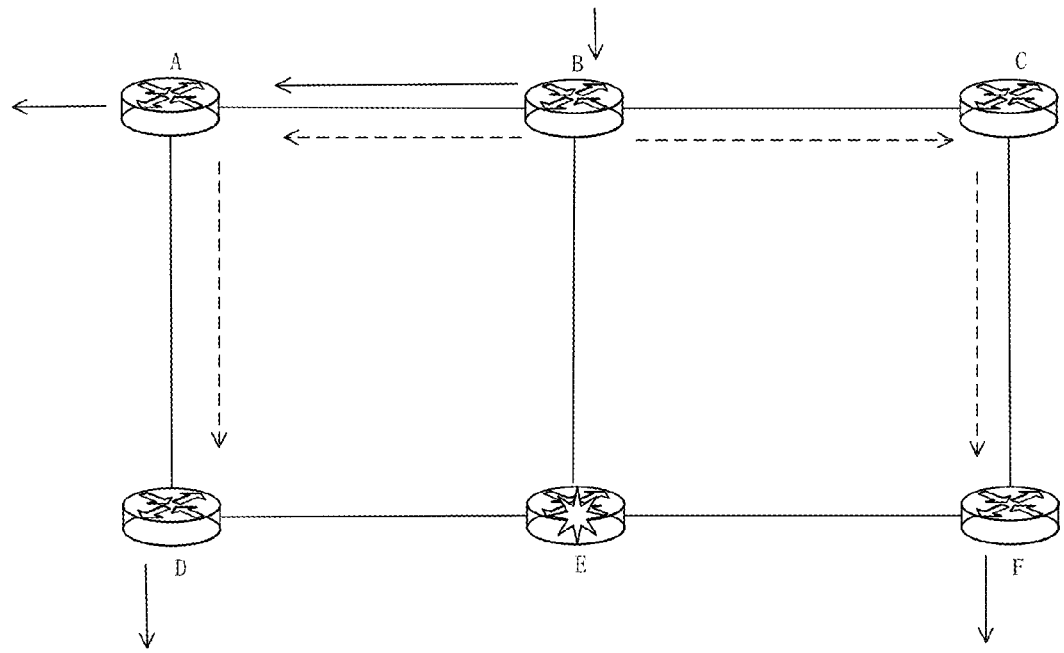
FIG. 19 is a schematic diagram of a multicast service traffic path when a node of the dual-ring topology shown in FIG. 17 fails.

In the case of the above failure, the multicast service traffic paths are shown in FIG. 19 with arrowed straight lines, where solid lines indicate that the multicast service traffic path which are not affected by the failure, and dotted lines indicate that the protection ring path used for replace the failure node.

Tenth Embodiment

Figure 20:
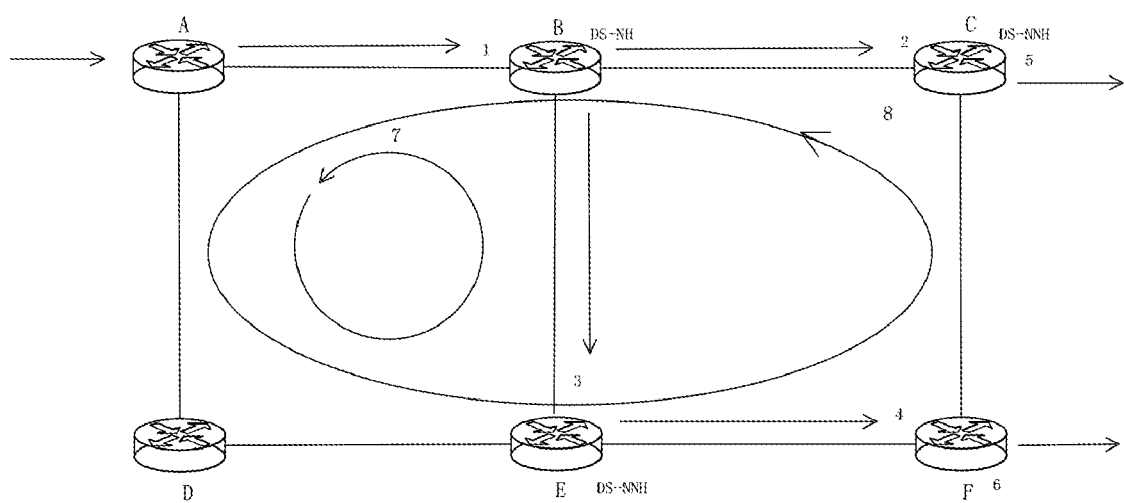
FIG. 20 is a schematic structural diagram of a dual-ring topology according to the tenth embodiment of the present disclosure.

In this embodiment, a failure protection process under a dual-ring topology scenario 2 is further described in combination with an actual situation. In the dual-ring topology scenario as shown in FIG. 20, BP1 on a link A→B is configured with TE-FRR protection. According to the scheme disclosed in this disclosure, protection rings BP 7 and 8 are allocated to a link A→B (in FIG. 20, BP8 is a small circular line in counterclockwise direction, and BP9 is a large elliptical line in the counterclockwise direction).

For example, there is a multicast service stream, wherein the BFIR is a node A, and the BFER is a node C, a node F; under a normal network condition, the traffic flow paths are A→B→C, A→B→E→F (see the arrowed straight line shown in FIG. 20).

Failure Scenario 1—Link Failure:

When the link A→B fails, the message forwarding process includes the following steps.

(1) The node A receives the BIER message, searches for BIFT according to the BitString (00111111) the of message with the matched BP of 1.

(2) Because of the failure of the link A→B, the associated BP1 status is Down, the BTAFT is searched, and the packet BitString is updated (Add BitMask=11000000, Reset BitMask=00000001). The updated BitString=11111111110, and the P field in the message header is set.

(3) Because the P field is set, corresponding BRFT table entries need to be searched. Table entries corresponding to BP 7 in the BRFT of the node B are matched (actually, both table entries corresponding to BP 7 and BP 8 are matched, referring to the BRFT integration process in the fifth embodiment; BP7 and BP8 can only select one because of the C-BM; in this embodiment, BP7 is selected; in a similar scenario, the selection of a proper BP policy is not involved in the present disclosure). The condition C2 is not satisfied (i.e., forwarding along the protection ring is required).

(4) Copy a message, wherein the BitString is still 11111110 without modification, and forward the message to a downstream node D through an adjacent port.

(5) A node D (a node E is the same as the node D) receives a BIER message with a P field set (the message travels a protection ring path). The BRFT table entries are searched. Similarly to the node A, table entries corresponding BP7 is selected from BP7 and BP8. The condition C2 is not met. The message (BitString=11111111110) is copied and forwarded to a downstream node E (a node B).

(6) The node B receives the BIER message with P field set. The BRFT table entries are searched with table entries corresponding to BP7 and BP8 matched. Due to A→B link failure, its associated status is DOWN, and thus the condition C2 is satisfied.

(7) Copy the message, clear the setting of P field (BitString=11111110), and turn to a BIFT forwarding process, The table entries corresponding to BP2 and BP3 in the BIFT are matched, and the message is forwarded from corresponding adjacent ports to a node C and a node E (BitString=11111000), respectively.

(8) The messages (BitString=11111000) to the node C and the node E do not have the P flag bit. The subsequent process is the original BIFT forwarding process, which is not involved in the disclosure and is not described for details.

Figure 21:
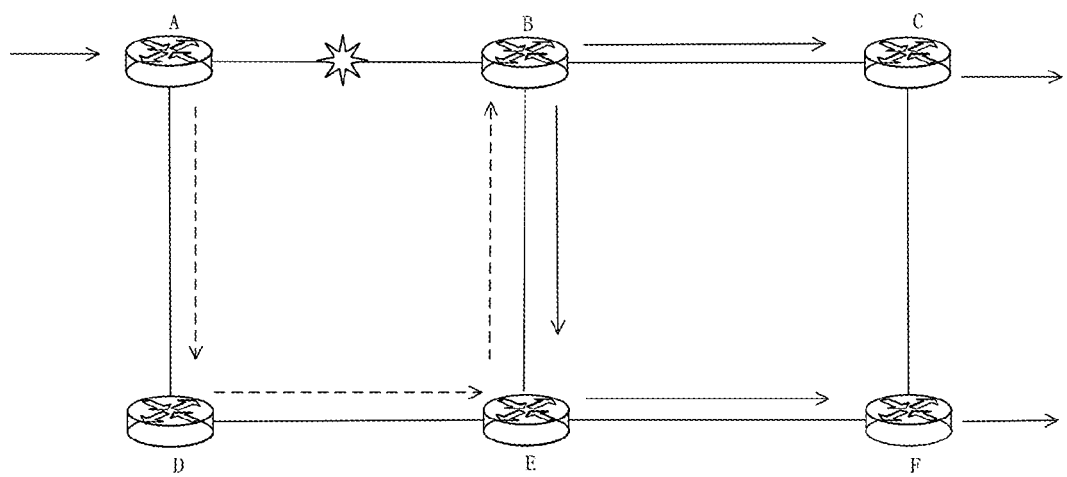
FIG. 21 is a schematic diagram of multicast service traffic path when a link of the dual-ring topology shown in FIG. 20 fails.

In the case of the above failure, the multicast service traffic paths are shown in FIG. 21 with arrowed straight lines, wherein solid lines indicate that the multicast service traffic path is not affected by the failure, and dotted lines indicate that the protection ring path used for replace the A→B path.

Failure Scenario 2—Node Failure:

When the node B fails, the forwarding process includes the following steps.

(1) The forwarding process at the node A and the node D is the same as the scenario for the A→B link failure.

(2) The node E receives the BIER message with the P field set (the message travels a protection ring path), the BRFT table entries are searched with table entries corresponding to BP7 matched. The status of the node B is DOWN due to the failure of the node B. Thus, the condition C2 is met.

(3) Copy a message, clear the setting of P field (BitString=11111110), and turn to a BIFT forwarding process. The table entries corresponding to BP4 in BRFT are matched. The message is forwarded to a downstream node F from the corresponding adjacent port; in the meanwhile, the original message (P flag bit is set) is updated to clear the bit corresponding to BP7 in BitString (BitString=10111110). The BRFT table entries are searched with the table entries corresponding to BP8 matched. The condition C2 is not met, and then the message is copied (wherein the BitString is not modified (BitString=10111110)) and forwarded to the downstream node F through an adjacent port.

(4) The node F receives two BIER messages, wherein the P field in one message not set (BitString=11111110) to carry out according to the original BIFT forwarding process (no more description will be provided hereinafter); the P field in the other message is set (BitString=10111110) to search BRFT with the table entries corresponding to BP8 matched. Thus, the condition C2 is not met, The message is copied and forwarded to a downstream node C through an adjacent port without modifying BitString (BitString=10111110).

(5) The node C receives the BIER message with the P field set (the message travels a protection ring path). The BRFT table entries are searched with table entries corresponding to BP8 matched. The status of the node B is DOWN due to the fault of the node B, so that the condition C2 is met.

(6) Copy the message, clear the setting of P field (BitString=10111110), and turn to a BIFT forwarding process, wherein the table entries corresponding to BP5 in the BIFT are matched. Due of the type of local-decap, the message needs to strip a BIER message header at the node C. The BIER forwarding process is closed. The others setting bits in the BitString has no matching table entries in the BIFT.

Figure 22:
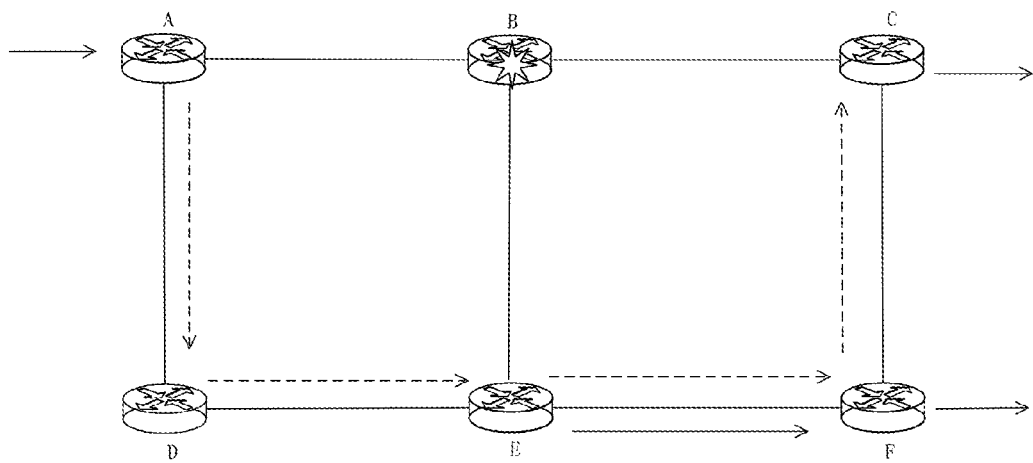
FIG. 22 is a schematic diagram of a multicast service traffic path when a node of the dual-ring topology shown in FIG. 20 fails.

In the case of the above failure, the multicast service traffic paths are shown in FIG. 22 with arrowed straight lines, where solid lines indicate that the multicast service traffic path is not affected by the failure, and dotted lines indicate that the protection ring path used for replace the failure node.

The BIER-TE network failure protection scheme proposed in the embodiments of the present disclosure is based on network topology, and does not involve in specific multicast services. In some scenarios, a problem that a specific node may receive double traffic may occur. Several schemes proposed in Draft-Eckert-Bier-Te-Frr also have such problems. The solution in relation to this problem is out of the scope of the present disclosure.

The method, system and storage medium for network fault protection in BIER-TE provided by the embodiments of the present disclosure can allocate protection ring bit position to each forwarding link of a ring topology, where a direction of the protection ring bit position is set opposite to a working path of the corresponding forwarding link. And simultaneously, a BRFT is newly added for storing adjacent forwarding table entries relevant to forwarding along the direction of the protection ring bit position. Thus, when the BIER message is forwarded along the working path, if the BFR detects that the downstream adjacency of a certain forwarding link fails, the entry content of the BTAFT is searched, the correlation between the link bit position of the failure forwarding link and the protection ring bit position is found, and the BIER message is forwarded to the opposite end failure point along the direction of the protection ring bit position on the basis of the entry content of the BRFT. Therefore, when the BIER message is forwarded, the failure forwarding link can be bypassed, and the BIER message can be ensured to be forwarded to each normal node of the ring topology successfully.

The above-mentioned serial numbers of the embodiments of the present disclosure are merely for description, and do not represent the advantages or disadvantages of the embodiments.

While the embodiments of the present disclosure have been described in connection with the appended drawings, the present disclosure is not limited to the specific embodiments described above. The specific embodiments described above are intended to be illustrative rather than restrictive, and many modifications may be made by one skilled in the art under the revelation of this disclosure without departing from the purpose of the disclosure and the scope of the appended claims, and these are all within the protection of this disclosure.

INDUSTRIAL APPLICABILITY

The present disclosure relates to the field of network technology. According to the embodiment provided by the disclosure, by setting protection ring the bit position and adding the BRFT, the BIER message can bypass the failure forwarding link when being forwarded, and the BIER message is ensured to be successfully forwarded to each normal node of the ring topology.

The invention claimed is:

1. A network failure protection method, comprising:
allocating a protection ring bit position for each forwarding link of a ring topology, wherein a direction of the protection ring bit position is opposite to a working path of a corresponding forwarding link;
newly adding a Bit Index Explicit Replication (BIER) Ring Forwarding Table (BRFT), wherein the BRFT is configured to store an adjacent forwarding table entry related to forwarding along the direction of the protection ring bit position; and
when a BIER message is forwarded along the working path, in response to a failure of downstream adjacency of a forwarding link detected by a BIER Forwarding Router (BFR), searching for entry content of a Bit Index Explicit Replication Traffic Engineering (BIER-TE) Adjacency FRR Table (BTAFT) to find a correlation between a link bit position of a failure forwarding link and the protection ring bit position, and forwarding, on the basis of the entry content of the BRFT, the BIER message to a failure point of an opposite end along the direction of the protection ring bit position.

2. The network failure protection method according to claim 1, wherein the BRFT includes Bit Index Information, Adjacencies Information, DNR (Do Not Reset) Information, C-BM (Clear-BitMask) Information that needs to be cleared when a message is forwarded and Entry Status Information.

3. The network failure protection method according to claim 1, wherein before when the BIER message is forwarded along the working path, in response to the failure of downstream adjacency of the forwarding link detected by the BFR, searching for entry contents of the BTAFT to find the correlation between the link bit position of the failure forwarding link and the protection ring bit position, and forwarding, on the basis of the entry content of the BRFT, the BIER message to the failure point of the opposite end along the direction of the protection ring bit position, the method further comprises:
expanding a BIER message header, to distinguish, by a newly added field, whether the BIER message is forwarded along the working path or along the direction of the protection ring bit position.

4. The network failure protection method according to claim 3, wherein when the BIER message is forwarded along the working path, in response to the failure of downstream adjacency of the forwarding link detected by the BFR, searching for entry contents of the BTAFT to find the correlation between the link bit position of the failure forwarding link and the protection ring bit position, and forwarding, on the basis of the entry content of the BRFT, the BIER message to the failure point of the opposite end along the direction of the protection ring bit position, comprises:
in response to a failure of the downstream adjacency to which the BIER message needs to be forwarded, modifying a bit string content of the BIER message to replace the link bit position of the failure forwarding link with the protection ring bit position of the failure forwarding link, and setting the newly added field of the BIER message header.

5. The network failure protection method according to claim 4, wherein, when the BIER message is forwarded, whether to search an original Bit Index Forwarding Table (BIFT) or to search the newly added BRFT to forward is determined according to whether the newly added field of the BIER message head is set.

6. The network failure protection method according to claim 5, wherein, searching the BRFT to forward comprises:
copying and forwarding bit-by-bit according to a bit string at the BIER message header, and checking table entries of the BRFT one by one to detect whether a current table entry of the BRFT meets a condition of off-protection ring; and
responsive to determining that the condition of off-protection ring is met, clearing a setting of the newly added field at the BIER message header, copying the BIER message, and searching the BIFT to forward; or
responsive to determining that the condition of off-protection ring is not met, directly copying the BIER message and forwarding the BIER message through an adjacent port corresponding to the current table entry of the BRFT.

7. The network failure protection method according to claim 1, wherein the entry content of the BRFT is formed by, according to a distribution process of the protection ring bit position, carrying out BRFT table configuration on each node passed by the protection ring bit position.

8. The network failure protection method according to claim 7, wherein before when the BIER message is forwarded along the working path, in response to the failure of downstream adjacency of the forwarding link detected by the BFR, searching for entry contents of the BTAFT to find the correlation between the link bit position of the failure forwarding link and the protection ring bit position, and forwarding, on the basis of the entry content of the BRFT, the BIER message to the failure point of the opposite end along the direction of the protection ring bit position, the method further comprises:
sending the table entries related to BIER message forwarding to the BFR through a southbound interface.

9. A non-transitory storage medium, storing at least one program, wherein when executed by at least one processor, the at least one program implements the steps of the method of network failure protection according to claim 1.

10. A network failure protection system, comprising a Bit Index Explicit Replication Traffic Engineering (BIER-TE) controller and a Bit Index Explicit Replication (BIER) Forwarding Router, wherein:
the BIER-TE controller is configured to allocate a protection ring bit position for each forwarding link of a ring topology, wherein a direction of the protection ring bit position is opposite to a working path of a corresponding forwarding link, newly add a BIER Ring Forwarding Table (BRFT), wherein the BRFT is configured to store an adjacent forwarding table entry related to forwarding along the direction of the protection ring bit position, and forward the table entry related to forwarding of a BIER message to the BIER Forwarding Router through a southbound interface; and the BIER Forwarding Router is configured to receive the table entry related to forwarding of the BIER message sent from the BIER-TE controller through the southbound interface; when the BIER message is forwarded along the working path, in response to a failure of downstream adjacency of a forwarding link detected by the BIER forwarding router (BFR), search for the entry content of a BIER-TE Adjacency FRR Table (BTFT) to find a correlation between a link bit position of a failure forwarding link and the protection ring bit position, and forward, on the basis of the entry content of the BRFT, the BIER message to a failure point of an opposite end along the direction of the protection ring bit position.

11. The network failure protection system according to claim 10, wherein the BIER-TE controller comprises:
a Path Computation Element (PCE), configured to calculate a protection ring path of each forwarding link to determine the protection ring bit position corresponding to the protection ring path;
a ring BitPosition (BP) resource allocator, configured to allocate the protection ring bit position for each forwarding link, and determine whether the protection ring bit position is able to be shared;
a BRFT entry generator/integrator, configured to generate an initial BRFT table according to the allocation of the protection ring bit position, and integrate Clear-Bit-Mask (C-BM) information of the initial BRFT table according to a BRFT integration method;
a protection correlation manager, configured to manage the correlation between the link bit position of each forwarding link and the protection ring bit position; and
a table entry issuer, configured to issue the table entry related to forwarding of the BIER message to the BIER Forwarding Router through the southbound interface.

12. The network failure protection system according to claim 10, wherein the BIER Forwarding Router comprises:
an entry configurator, configured to receive the table entry related to forwarding of the BIER message sent from the BIER-TE controller through the southbound interface;
a message encapsulator, configured to encapsulate the BIER message, wherein the encapsulation includes modifying a bit string content of the BIER message and setting for a newly added field in the BIER message header;
a message analyzer, configured to extra analyze whether or not the newly added field of the BIER message header is set;
a message sender/receiver, configured to send and receive the BIER message;
a BIER-TE protection forwarder, configured to determine, according to a setting condition of the newly added field in the BIER message header, whether the BIER message is forwarded along the working path or along the direction of the protection ring bit position;
a BRFT forwarder, configured to perform bit-wise copying and forwarding according to the newly added field in the BIER message header in combination with the entry contents of the BRFT; and
a fast detector, configured to perform a connectivity detection on each forwarding link in the ring topology by a fast detection means.

* * * * *